(12) United States Patent
Louch et al.

(10) Patent No.: US 7,743,336 B2
(45) Date of Patent: Jun. 22, 2010

(54) WIDGET SECURITY

(75) Inventors: John O. Louch, San Luis Obispo, CA (US); Scott Forstall, Mountain View, CA (US); Eric Steven Peyton, Lisle, IL (US)

(73) Assignee: Apple Inc., Cupertino, CA (US)

( * ) Notice: Subject to any disclaimer, the term of this patent is extended or adjusted under 35 U.S.C. 154(b) by 591 days.

(21) Appl. No.: 11/432,295

(22) Filed: May 10, 2006

(65) Prior Publication Data

US 2007/0101433 A1 May 3, 2007

Related U.S. Application Data

(60) Provisional application No. 60/730,956, filed on Oct. 27, 2005.

(51) Int. Cl.
*G06F 15/00* (2006.01)
*G06F 13/00* (2006.01)

(52) U.S. Cl. .......................... 715/766; 715/778

(58) Field of Classification Search ............... 715/766, 715/778, 804, 841, 762–765, 835
See application file for complete search history.

(56) References Cited

U.S. PATENT DOCUMENTS

| | | |
|---|---|---|
| 4,752,893 A | 6/1988 | Guttag et al. |
| 5,168,441 A | 12/1992 | Onarheim et al. |
| 5,289,574 A | 2/1994 | Sawyer |
| 5,297,250 A | 3/1994 | Leroy et al. |
| 5,351,995 A | 10/1994 | Booker |
| 5,357,603 A | 10/1994 | Parker |
| 5,388,201 A | 2/1995 | Hourvitz et al. |
| 5,416,890 A | 5/1995 | Beretta |
| 5,481,665 A | 1/1996 | Okada et al. |
| 5,490,246 A | 2/1996 | Brotsky et al. |
| 5,522,022 A | 5/1996 | Rao et al. |
| 5,537,630 A | 7/1996 | Berry et al. |
| 5,564,002 A | 10/1996 | Brown |
| 5,564,022 A | 10/1996 | Debnath et al. |
| 5,588,098 A | 12/1996 | Chen et al. |
| 5,602,997 A | 2/1997 | Carpenter et al. |
| 5,638,501 A | 6/1997 | Gough et al. |
| 5,644,737 A | 7/1997 | Tuniman et al. |
| 5,644,739 A | 7/1997 | Moursund |

(Continued)

FOREIGN PATENT DOCUMENTS

DE 102 42 378 3/2004

(Continued)

OTHER PUBLICATIONS

"Writing a Desk Accessory," Developer Connection, Apple Computer, Inc. Jul. 3, 1996, [online] [Retrieved on Jan. 3, 2006] Retrieved from the Internet URL: http://developer.apple.com/documentation/mac/devices-16.html>, 3 pages.

(Continued)

*Primary Examiner*—Kevin Nguyen
(74) *Attorney, Agent, or Firm*—Fish & Richardson P.C.

(57) ABSTRACT

A widget security system, method and computer-readable medium detects a security event associated with a widget, assesses the risk associated with the security event, and initiates a security action based on the assessed risk.

19 Claims, 5 Drawing Sheets

U.S. PATENT DOCUMENTS

| | | |
|---|---|---|
| 5,651,107 A | 7/1997 | Frank et al. |
| 5,657,049 A | 8/1997 | Ludolph et al. |
| 5,659,693 A | 8/1997 | Hansen et al. |
| 5,659,694 A | 8/1997 | Bibayan |
| 5,671,343 A | 9/1997 | Kondo et al. |
| 5,689,664 A | 11/1997 | Narayanan et al. |
| 5,708,764 A | 1/1998 | Borrel et al. |
| 5,721,848 A | 2/1998 | Joseph |
| 5,727,135 A | 3/1998 | Webb et al. |
| 5,731,819 A | 3/1998 | Gagne et al. |
| 5,742,285 A | 4/1998 | Ueda |
| 5,754,174 A | 5/1998 | Carpenter et al. |
| 5,760,773 A | 6/1998 | Berman et al. |
| 5,764,229 A | 6/1998 | Bennett |
| 5,764,238 A | 6/1998 | Lum et al. |
| 5,790,120 A | 8/1998 | Lozares et al. |
| 5,793,376 A | 8/1998 | Tanaka et al. |
| 5,796,402 A | 8/1998 | Ellison-Taylor |
| 5,801,703 A | 9/1998 | Bowden et al. |
| 5,809,230 A | 9/1998 | Pereira |
| 5,835,692 A | 11/1998 | Cragun et al. |
| 5,835,693 A | 11/1998 | Lynch et al. |
| 5,838,316 A | 11/1998 | Arruza |
| 5,870,734 A | 2/1999 | Kao |
| 5,877,741 A | 3/1999 | Chee et al. |
| 5,877,762 A | 3/1999 | Young |
| 5,878,219 A | 3/1999 | Vance et al. |
| 5,883,639 A | 3/1999 | Walton et al. |
| 5,900,876 A | 5/1999 | Yagita et al. |
| 5,903,896 A | 5/1999 | Waldman et al. |
| 5,920,659 A | 7/1999 | Iverson et al. |
| 5,929,852 A | 7/1999 | Fisher et al. |
| 5,933,148 A | 8/1999 | Oka et al. |
| 5,949,409 A | 9/1999 | Tanaka et al. |
| 5,963,191 A | 10/1999 | Jaaskelainen, Jr. |
| 5,978,579 A | 11/1999 | Buxton et al. |
| 5,999,948 A | 12/1999 | Nelson et al. |
| 6,005,568 A | 12/1999 | Simonoff et al. |
| 6,006,231 A | 12/1999 | Popa |
| 6,011,562 A | 1/2000 | Gagne et al. |
| 6,031,937 A | 2/2000 | Graffagnino |
| 6,045,446 A | 4/2000 | Ohshima |
| 6,075,543 A | 6/2000 | Akeley |
| 6,128,010 A | 10/2000 | Baxter et al. |
| 6,133,915 A | 10/2000 | Arcuri et al. |
| 6,144,381 A | 11/2000 | Lection et al. |
| 6,154,601 A | 11/2000 | Yaegashi et al. |
| 6,166,748 A | 12/2000 | Van Hook et al. |
| 6,167,533 A | 12/2000 | Potterveld et al. |
| 6,188,399 B1 | 2/2001 | Voas et al. |
| 6,191,797 B1 | 2/2001 | Politis |
| 6,195,664 B1 | 2/2001 | Tolfa |
| 6,211,890 B1 | 4/2001 | Ohba |
| 6,246,418 B1 | 6/2001 | Oka |
| 6,259,432 B1 | 7/2001 | Yamada et al. |
| 6,266,053 B1 | 7/2001 | French et al. |
| 6,266,430 B1 | 7/2001 | Rhoads |
| 6,272,484 B1 | 8/2001 | Martin et al. |
| 6,272,558 B1 | 8/2001 | Hui et al. |
| 6,275,831 B1 | 8/2001 | Bodnar et al. |
| 6,278,448 B1 | 8/2001 | Brown et al. |
| 6,278,450 B1 | 8/2001 | Arcuri et al. |
| 6,300,947 B1 | 10/2001 | Kanevsky |
| 6,304,684 B1 | 10/2001 | Niczyporuk et al. |
| 6,307,574 B1 | 10/2001 | Ashe et al. |
| 6,310,621 B1 | 10/2001 | Gagne et al. |
| 6,313,851 B1 | 11/2001 | Matthews, III et al. |
| 6,321,314 B1 | 11/2001 | Van Dyke |
| 6,333,753 B1 | 12/2001 | Hinckley |
| 6,344,855 B1 | 2/2002 | Fisher et al. |
| 6,353,437 B1 | 3/2002 | Gagne |
| 6,369,823 B2 | 4/2002 | Ohba |
| 6,369,830 B1 | 4/2002 | Brunner et al. |
| 6,396,520 B1 | 5/2002 | Ording |
| 6,401,104 B1 | 6/2002 | LaRue et al. |
| 6,411,301 B1 | 6/2002 | Parikh et al. |
| 6,412,021 B1 | 6/2002 | Nguyen et al. |
| 6,421,058 B2 | 7/2002 | Parikh et al. |
| 6,424,348 B2 | 7/2002 | Parikh |
| 6,434,744 B1 | 8/2002 | Chamberlain et al. |
| 6,452,600 B1 | 9/2002 | Parikh et al. |
| 6,456,290 B2 | 9/2002 | Parikh et al. |
| 6,457,034 B1 | 9/2002 | Morein |
| 6,466,218 B2 | 10/2002 | Parikh et al. |
| 6,469,714 B2 | 10/2002 | Buxton et al. |
| 6,483,524 B1 | 11/2002 | Petchenkine et al. |
| 6,484,261 B1 | 11/2002 | Wiegel |
| 6,487,560 B1 | 11/2002 | LaRue et al. |
| 6,489,963 B2 | 12/2002 | Parikh et al. |
| 6,512,522 B1 | 1/2003 | Miller et al. |
| 6,515,682 B1 | 2/2003 | Washington et al. |
| 6,525,736 B1 | 2/2003 | Erikawa et al. |
| 6,526,174 B1 | 2/2003 | Graffagnino |
| 6,535,892 B1 | 3/2003 | LaRue et al. |
| 6,536,041 B1 | 3/2003 | Knudson et al. |
| 6,542,160 B1 | 4/2003 | Abgrall |
| 6,542,166 B1 | 4/2003 | Washington et al. |
| 6,544,295 B1 | 4/2003 | Bodnar |
| 6,571,328 B2 | 5/2003 | Liao et al. |
| 6,573,896 B1 | 6/2003 | Ribadeau et al. |
| 6,577,317 B1 | 6/2003 | Duluk, Jr. et al. |
| 6,580,430 B1 | 6/2003 | Hollis et al. |
| 6,590,592 B1 | 7/2003 | Nason et al. |
| 6,609,977 B1 | 8/2003 | Shimizu et al. |
| 6,614,444 B1 | 9/2003 | Duluk, Jr. et al. |
| 6,618,048 B1 | 9/2003 | Leather |
| 6,636,214 B1 | 10/2003 | Leather et al. |
| 6,639,595 B1 | 10/2003 | Drebin et al. |
| 6,661,426 B1 | 12/2003 | Jetha et al. |
| 6,664,958 B1 | 12/2003 | Leather et al. |
| 6,664,962 B1 | 12/2003 | Komsthoeft et al. |
| 6,664,986 B1 | 12/2003 | Kopelman et al. |
| 6,674,438 B1 | 1/2004 | Yamamoto et al. |
| 6,697,074 B2 | 2/2004 | Parikh et al. |
| 6,707,462 B1 | 3/2004 | Peercy et al. |
| 6,714,201 B1 | 3/2004 | Grinstein et al. |
| 6,714,221 B1 | 3/2004 | Christie et al. |
| 6,715,053 B1 | 3/2004 | Grigor |
| 6,717,599 B1 | 4/2004 | Olano |
| 6,724,403 B1 | 4/2004 | Santoro et al. |
| 6,734,864 B2 | 5/2004 | Abgrall |
| 6,738,804 B1 | 5/2004 | Lo |
| 6,741,242 B1 | 5/2004 | Itoh et al. |
| 6,742,042 B1 | 5/2004 | Holden et al. |
| 6,760,046 B2 | 7/2004 | I'Anson et al. |
| 6,765,592 B1 | 7/2004 | Pletcher et al. |
| 6,788,318 B2 | 9/2004 | Chen |
| 6,792,616 B1 | 9/2004 | Jerding et al. |
| 6,806,892 B1 | 10/2004 | Plow et al. |
| 6,882,979 B1 | 4/2005 | Reay et al. |
| 6,892,360 B1 | 5/2005 | Pabla et al. |
| 6,906,720 B2 | 6/2005 | Emberling et al. |
| 6,910,000 B1 | 6/2005 | Yedidia et al. |
| 6,911,984 B2 | 6/2005 | Sabella et al. |
| 6,918,091 B2 | 7/2005 | Leavitt et al. |
| 6,931,633 B1 | 8/2005 | Vazquez et al. |
| 6,944,829 B2 | 9/2005 | Dando |
| 6,993,721 B2 | 1/2006 | Rosin et al. |
| 7,016,011 B2 | 3/2006 | De Haan |
| 7,027,055 B2 | 4/2006 | Anderson et al. |
| 7,050,955 B1 | 5/2006 | Carmel et al. |
| 2001/0030647 A1 | 10/2001 | Sowizral et al. |
| 2001/0035885 A1 | 11/2001 | Iron et al. |
| 2002/0054148 A1 | 5/2002 | Okada |

| | | |
|---|---|---|
| 2002/0059594 A1 | 5/2002 | Rasmussen et al. |
| 2002/0065946 A1 | 5/2002 | Narayan |
| 2002/0067418 A1 | 6/2002 | Hiroaki |
| 2002/0078453 A1 | 6/2002 | Kuo |
| 2002/0085037 A1 | 7/2002 | Leavitt et al. |
| 2002/0089526 A1 | 7/2002 | Buxton et al. |
| 2002/0093516 A1 | 7/2002 | Brunner et al. |
| 2002/0099678 A1 | 7/2002 | Albright et al. |
| 2002/0105548 A1 | 8/2002 | Hayton et al. |
| 2002/0112180 A1 | 8/2002 | Land et al. |
| 2002/0118217 A1 | 8/2002 | Fujiki |
| 2002/0120673 A1 | 8/2002 | Tolson et al. |
| 2002/0123739 A1 | 9/2002 | Haacke et al. |
| 2002/0129092 A1 | 9/2002 | Tolson et al. |
| 2002/0133508 A1 | 9/2002 | LaRue et al. |
| 2002/0140740 A1 | 10/2002 | Chen |
| 2002/0158902 A1 | 10/2002 | Hooker et al. |
| 2002/0171682 A1 | 11/2002 | Frank et al. |
| 2002/0174003 A1 | 11/2002 | Redmann et al. |
| 2002/0174181 A1 | 11/2002 | Wei |
| 2002/0180798 A1 | 12/2002 | Poor et al. |
| 2002/0186257 A1 | 12/2002 | Cadiz et al. |
| 2002/0196268 A1 | 12/2002 | Wolff et al. |
| 2003/0008711 A1 | 1/2003 | Corbo |
| 2003/0009267 A1 | 1/2003 | Dunsky et al. |
| 2003/0018971 A1 | 1/2003 | McKenna, Jr. |
| 2003/0020671 A1 | 1/2003 | Santoro et al. |
| 2003/0046316 A1 | 3/2003 | Gergic et al. |
| 2003/0061482 A1 * | 3/2003 | Emmerichs .................. 713/165 |
| 2003/0067489 A1 | 4/2003 | Wong et al. |
| 2003/0069904 A1 | 4/2003 | Hsu et al. |
| 2003/0076369 A1 | 4/2003 | Resner et al. |
| 2003/0080995 A1 | 5/2003 | Tenenbaum et al. |
| 2003/0097659 A1 | 5/2003 | Goldman |
| 2003/0101046 A1 | 5/2003 | Krasnov |
| 2003/0122787 A1 | 7/2003 | Zimmerman et al. |
| 2003/0123739 A1 | 7/2003 | Graffagnino |
| 2003/0146934 A1 | 8/2003 | Bailey et al. |
| 2003/0154239 A1 | 8/2003 | Davis et al. |
| 2003/0158975 A1 | 8/2003 | Frank et al. |
| 2003/0164862 A1 | 9/2003 | Cadiz et al. |
| 2003/0169306 A1 | 9/2003 | Makipaa et al. |
| 2003/0174136 A1 | 9/2003 | Emberling et al. |
| 2003/0174154 A1 | 9/2003 | Yukie et al. |
| 2003/0184552 A1 | 10/2003 | Chadha |
| 2003/0184584 A1 | 10/2003 | Vachuska et al. |
| 2003/0189597 A1 | 10/2003 | Anderson et al. |
| 2003/0191799 A1 | 10/2003 | Araujo et al. |
| 2003/0208685 A1 | 11/2003 | Abdel-Rahman |
| 2004/0003402 A1 | 1/2004 | McKenna, Jr. |
| 2004/0012626 A1 | 1/2004 | Brookins |
| 2004/0032409 A1 | 2/2004 | Girard |
| 2004/0036711 A1 | 2/2004 | Anderson |
| 2004/0039934 A1 | 2/2004 | Land et al. |
| 2004/0070629 A1 | 4/2004 | Seifert |
| 2004/0125128 A1 | 7/2004 | Chang et al. |
| 2004/0179019 A1 | 9/2004 | Sabella et al. |
| 2004/0194020 A1 | 9/2004 | Beda et al. |
| 2004/0205504 A1 | 10/2004 | Phillips |
| 2004/0212640 A1 | 10/2004 | Mann et al. |
| 2004/0215740 A1 | 10/2004 | Frank et al. |
| 2004/0223003 A1 | 11/2004 | Heirich et al. |
| 2004/0225955 A1 | 11/2004 | Ly |
| 2004/0255253 A1 | 12/2004 | Marcjan |
| 2004/0261012 A1 | 12/2004 | Balsiger |
| 2004/0261037 A1 | 12/2004 | Ording et al. |
| 2004/0261038 A1 | 12/2004 | Ording et al. |
| 2005/0010419 A1 | 1/2005 | Pourhamid |
| 2005/0010634 A1 | 1/2005 | Henderson et al. |
| 2005/0021935 A1 | 1/2005 | Schillings et al. |
| 2005/0022139 A1 | 1/2005 | Gettman et al. |
| 2005/0039144 A1 | 2/2005 | Wada et al. |
| 2005/0057497 A1 | 3/2005 | Kawahara |
| 2005/0060655 A1 | 3/2005 | Gray et al. |
| 2005/0060661 A1 | 3/2005 | Kawahara et al. |
| 2005/0088447 A1 | 4/2005 | Hanggie et al. |
| 2005/0088452 A1 | 4/2005 | Hanggie et al. |
| 2005/0091571 A1 | 4/2005 | Leichtling |
| 2005/0114021 A1 | 5/2005 | Krull et al. |
| 2005/0144563 A1 | 6/2005 | Hough et al. |
| 2005/0144595 A1 * | 6/2005 | McLean ..................... 717/136 |
| 2005/0149458 A1 | 7/2005 | Eglen et al. |
| 2005/0160368 A1 | 7/2005 | Liu et al. |
| 2005/0168471 A1 | 8/2005 | Paquette |
| 2005/0168476 A1 | 8/2005 | Levene et al. |
| 2005/0172239 A1 | 8/2005 | Liu et al. |
| 2005/0183026 A1 | 8/2005 | Amano et al. |
| 2005/0193368 A1 | 9/2005 | Becker et al. |
| 2005/0198584 A1 | 9/2005 | Matthews et al. |
| 2005/0215310 A1 | 9/2005 | Boyd et al. |
| 2005/0240857 A1 | 10/2005 | Benedict et al. |
| 2005/0256940 A1 | 11/2005 | Henderson et al. |
| 2005/0278651 A1 | 12/2005 | Coe et al. |
| 2005/0282612 A1 | 12/2005 | Matthews |
| 2005/0283734 A1 | 12/2005 | Santoro et al. |
| 2006/0015818 A1 | 1/2006 | Chaudhri et al. |
| 2006/0075106 A1 | 4/2006 | Hochmuth et al. |
| 2006/0075141 A1 | 4/2006 | Boxenhorn |
| 2006/0089840 A1 | 4/2006 | May |
| 2006/0095331 A1 | 5/2006 | O'Malley et al. |
| 2006/0107231 A1 | 5/2006 | Matthews et al. |
| 2006/0123356 A1 | 6/2006 | Sobeski et al. |
| 2006/0218499 A1 | 9/2006 | Matthew et al. |
| 2006/0277469 A1 | 12/2006 | Chaudhri et al. |
| 2007/0038934 A1 | 2/2007 | Fellman |
| 2007/0044029 A1 | 2/2007 | Fisher et al. |
| 2007/0044039 A1 | 2/2007 | Amadio et al. |
| 2007/0061724 A1 | 3/2007 | Slothouber et al. |
| 2007/0101146 A1 | 5/2007 | Louch et al. |
| 2007/0101279 A1 | 5/2007 | Chaudhri et al. |
| 2007/0101288 A1 | 5/2007 | Forstall et al. |
| 2007/0101291 A1 | 5/2007 | Forstall |
| 2007/0101297 A1 | 5/2007 | Forstall et al. |
| 2007/0118813 A1 | 5/2007 | Forstall et al. |
| 2007/0130541 A1 | 6/2007 | Louch et al. |
| 2007/0162850 A1 | 7/2007 | Adler et al. |
| 2007/0203984 A2 | 8/2007 | AlHusseini et al. |
| 2007/0209013 A1 | 9/2007 | Ramsey et al. |
| 2007/0266093 A1 | 11/2007 | Forstall et al. |
| 2008/0034309 A1 | 2/2008 | Louch et al. |
| 2008/0034314 A1 | 2/2008 | Louch et al. |
| 2008/0168367 A1 | 7/2008 | Chaudhri et al. |
| 2008/0168368 A1 | 7/2008 | Louch et al. |
| 2008/0168382 A1 | 7/2008 | Louch et al. |
| 2009/0021486 A1 | 1/2009 | Chaudhri et al. |
| 2009/0024944 A1 | 1/2009 | Louch et al. |
| 2009/0044138 A1 | 2/2009 | Rudolph et al. |

FOREIGN PATENT DOCUMENTS

| | | |
|---|---|---|
| EP | 548586 | 6/1993 |
| EP | 0694879 | 1/1996 |
| EP | 0 908 835 | 4/1999 |
| EP | 1 237 076 | 9/2002 |
| EP | 1383080 | 1/2004 |
| EP | 0972273 | 3/2004 |
| WO | WO 96/06401 | 2/1996 |
| WO | WO 97/07467 | 2/1997 |
| WO | WO 98/07112 | 2/1998 |
| WO | WO 1998/45815 | 10/1998 |
| WO | WO 2002/09039 | 1/2002 |
| WO | WO 2003/023593 | 3/2003 |
| WO | WO 2004/027707 | 4/2004 |
| WO | WO 2004/076977 | 9/2004 |
| WO | WO 2009/012319 | 12/2009 |

WO   WO 2009/012330   12/2009

OTHER PUBLICATIONS

Akeley, Kurt, and Hanrahan, Pat, "Real-Time Graphics Architecture," hup://www.grahics.stanford.edu/courses/cs448a-01-fall, the OpenGL Graphics System, CS448 Lecture 15, Fall, 2001, pp. 1-20.
Altman, R.B., "Visual Quickstart Guide Power Point 2000/98, Applying Preset Animations," ProQuest Safari Books, Peachpit Press, May 7, 1999, 7 pages [online] Retrieved from the Internet: <URL: http://proquest.safaribooksonline.com/0201354411>.
Archive of "Objects, Images and Applets," W3C Recommendation, Feb. 10, 2003, [online] [Archived by http://archivve.org; Retrieved on Apr. 13, 2006] Retrieved from the Internet URL:http://web.archivve.org/web/20030210154019/http://www.w3.org/TR/REC-html140/struct/objects.html, 21 pages.
Cadiz, JJ et al., "Slideshow: Providing Peripheral Awareness of Important Information," Technical Report MSR-TR-2001-83, (Sep. 14, 2001), 9 pages. Microsoft Corporation, Redmond, WA.
Conner Borookshire D. et al. "Three-Dimensional Widgets" AcCM1992, 8 pages.
Elliott, Conal, "Programming Graphics Processors Functionally," Proceedings of the 2004 Haskell Workshop, Sep. 22, 2004. 11 pages.
Fried, Ina, "Developer Calls Apple's Tiger a Copycat," CNET News.com, Jun. 28, 2004 [online] Retrieved on Jul. 1, 2004] Retrieved from the Internet URL:http://zdnet.com.com/2102-1104_2-250692.html?tag=printthis, 2 pages.
Fried, Ina, "For Apple's Tiger, the Keyword is Search", CNET News.com, Jun. 28, 2004 [online] Retrieved on Jul. 1, 2004] Retrieved from the Internet URL:http://zdnet.com.com/2102-1103_2-5250346.html?tag=printthis, 2 pages.
Guber, John et al., "Dashboard vs. Konfabulator", Jun. 2004, 9 pages.
Haeberli, P. et al., "The Accumulation Buffer: Hardware Support for High-Quality Rendering," Computer Graphics, Aug. 1990, pp. 309-318, vol. 24, No. 4.
Http://en.wikipedia.org/wiki/Comparison_of_widget_engines, 2007, 6 pages.
http://en.wikipedia.org/wiki/Windows-Sidebar, 2007, 7 pages.
http://www.nat.org/dashboard/blog.php3 Dec. 2003, 31 pages.
International Search Report, PCT/US2005/008804, Jul. 27, 2005, 3 pages.
International Search Report and Writen Opinion, PCT/US2005/022152, Jul. 10, 2006, 8 pages.
International Search report, PCT/US2005/008805, Aug. 8, 2005, 3 pages.
Konfabulator, "Cupertino, Start your Photocopiers!," [online] [Retrieved on Jul. 1, 2004] Retrieved from the Internet <URL:http://www.konfabulator.com>, 1 page.
Konfabulator, "Konfabulator & Widget Basics," [online] [Retrieved on Jul. 1, 2004] Retrieved from the Internet <URL: http://www.konfabulator.com/info/basics.html>, 3 pages.
Konfabulator, "Screenshots," [online] [Retrieved on Jul. 1, 2004] Retrieved from the Internet <URL: http://www.konfabulator.com/info/screenshots.html>, 2 pages.
Konfabulator, "What is Konfabulator?," [online] [Retrieved on Jul. 1, 2004] Retieved from the Internet <URL: http://www.konfabulator.com/info/, 3 pages.
Lammers, J.., et al., "Maya 4.5 Fundamentals: Particles, "New Riders Publishing, Jan. 14, 2003, 12 pages, [online] [retrieved on Feb. 17, 2007] Retrieved from ProQuest Safari Books Online on the Internet: <URL: http://proquest.safaribooksonline.com/0735713278>, 12 pages.
Notification of Transmittal of the International Search Report and the Written Opinion of the International Searching Authority, PCT/US2005/022579, 15 pages.
Nvidia, "CG—Teaching Cg," Power Point Presentation, Author and date unknown, pp. 1-16.
Puder, a., "Extending Desktop Applications to the Web," ACM International Conference Proceedings Series, Proceedings of the Jun. 2004 International Symposium on Information and Communication Technologies, 2004, vol. 90, 6 pages.

Rochkind, M. et al., "Common Elements in Today's Graphical User Interfaces: The Good, the Bad, and the Ugly," Interchi '93, AMC, Apr. 24-29, 1993, pp. 470-473.
Segal, Mark and Akeley, Kurt, "The OpenGL Graphics System: A Specification (Version 1.5)," Copyright 1992-2003 Silicon Graphics, Inc., Oct. 30, 2003, 334 pages.
Shantzis, Michael A., "A Model for Efficient and Flexible Image Computing," Computer Graphics Proceedings, Annual Conference Series, Orlando, Florida, July 24-29, 1994, pp. 147-154.
Shiozawa, Hidekazu et al., "Perspective Layered Visualization of Collaborative Workspaces," Proceedings of the International ACM SIGGROUP conference on Supporting Group Work Publisher, Nov. 1999, 5 pages.
Snippet Software Inc. et al. "Corporate Portal Newsletter" Oct. 2000, 3 pages.
Snippet Software Inc. et al. "Snippets Software" Jun. 2001, 16 pages.
Staples, Loretta, "Representation in Virtual Space: Visual Convention in the Graphical User Interface," Proceedings of the SIGCHI Conference on Human Factors in Computing Systems, Apr. 1993.
http://www.nat.org/dashboard/blog.php3 Dec. 2003, 8 pages.
Stardock.com et al. "DesktopX Whitepaper and users Guide" 1999, 72 pages.
Tang, J.C. et al., "ConNexus to Awarenex: Extending Awareness to Mobile Users," SIGCHI '01, AMC, Mar. 31-Apr. 4, 2001, 8 pages.
Ullenboom, C., "Java is auch eine Insel," 2003, [online] [Retrieved on Apr. 13, 2006] Retrieved from the Internet URL: http://www.galileocomputing.de/openbook/javainse12//java_140000.htm#Xxx998138, 3 pages.
Van Gelder, Allen, and Kwansik, Kim, "Direct Volume Rendering with Shading via Three-Dimensional Textures," Computer Science Dept., Univ. Of California, Santa Cruz, CA 95064, 9 pages.
Wardell, Brad, Konfabulator for Windows, Jan. 10, 2004; [online] Retrieved from the Internet Mar. 6, 2006] Retrieved from the Internet: URL:http://www.xpthemes.com/forums.asp?MID=19&CMID=19&AID=4472, 6 pages.
Forstall, et al., U.S. Appl. No. 12/469,555, filed May 20, 2009.
Akeley, "Cg — Teaching Cg," Power Point Presentation, NVIDIA Corporation, 2002; 1 page.
"Desktop Sidebar", Jan. 1, 2004, [online] [Retrieved on May 11, 2007] Retrieved from the Internet URL: http://web.archive.org/web/20040101160831/http://www.desktopsidebar.com/; 5 pages.
"Portlet Communication: What is application scope, anyway?", Sep. 18, 2002, [online]; Retrieved from the Internet at URL: http://wwwcoderanch.com/t/203244/Portals-Portlets/java/Portlet-Communication-What-application-scope; 3 pages.
Snippet Software, "Product Spotlight Non-browser based portal solution from Snippets Software", Corporate Portal Newsletter, Oct. 2000, vol. 1, No. 10, 3 pages.
Van Gelder et al., "Direct vol. Rendering with Shading via Three-Dimensional Textures,". Computer Science Dept., Univ. of California, Santa Cruz, CA 95064, Jul. 19, 1996; 17 pages.
"Desktop Sidebar", [online] [Retrieved on May 11, 2007] Retrieved from the Internet URL: http://web.archive.org/web/20040101160831/http://www.desktopsidebar.com/; 5 pages.
"Portlet Communication: What is application scope, anyway?", Sep. 18, 2002, [online]; Retrieved from the Internet at URL: http://wwwcoderanch.com/t/203244/Portals-Portlets/java/Portlet-Communication-What-application-scope; 3 pages.
Akeley, "Cg — Teaching Cg," Power Point Presentation, NVIDIA Corporation, 2002; 1 page.
International Search Report and Written Opinion, dated Sep. 3, 2009, issued in International Application No. PCT/US2008/050047; 17 pages.
Snippet Software, "Product Spotlight Non-browser based portal solution from Snippets Software", Corporate Portal Newsletter, Oct. 2000, vol. 1, No. 10, 3 pages.
Van Gelder et al., "Direct Volume Rendering with Shading via Three-Dimensional Textures,". Computer Science Dept., Univ. of California, Santa Cruz, CA 95064, Jul. 19, 1996; 17 pages.
"Sidekick", [Online] [Retrieved on Oct. 12, 2009] Retrieved from the Internet at URL: http://en.widipedia.org/wiki/Sidekick; 5 pages.
International Search Report and Written Opinion, dated Oct. 16, 2009, issued in International Application No. PCT/US2008/070217.

Caceres et al., "Widget 1.0 Requirements", [Online] [Downloaded on Sep. 10, 2009]; Retrieved from the Internet at URL: http://www.w3.org/TR/2007/WD-widgets-reqs-20070705; 30 pages.

Akeley, Kurt, and Hanrahan, Pat, "Real-Time Graphics Architecture," http://www.grahics.stanford.edu/courses/cs448a-01-fall, the OpenGL Graphics System, CS448 Lecture 15, Fall, 2001, pp. 1-20.

Altman, R.B., "Visual Quickstart Guide Power Point 2000/98, Applying Preset Animations," ProQuest Safari Books, Peachpit Press, May 7, 1999, 7 pages [online] Retrieved from the Internet: <URL: http://proquest.safaribooksonline.com/0201354411>.

Beier et al., "The bull's-eye: A framework for web application user interface design guidelines", Proceedings of the Sigchi Conference on Human Factors in Computing Systems, Apr. 2003, pp. 489-496.

Cadiz, Jj et al., "Slideshow: Providing Peripheral Awareness of Important Information," Technical Report MSR-TR-2001-83, (Sep. 14, 2001), 9 pages Microsoft Corporation, Redmond, WA.

Carey et al., "Integrating Widget Design Knowledge with User Interface Toolkits", Proceedings of the Fifth International Workshop on Computer-Aided Software Engineering, Jul. 1992, pp. 204-212.

Chen et al., "The Model of Optimum Route Selection in Vehicle Automatic Navigation System Based on Unblocked Reliability Analyses", Intelligent Transportation Systems, 2003, Proceedings, IEEE (2003), vol. 2, 12-15, Oct. 2003, pp. 975-978.

Conner et al. "Three-Dimensional Widgets" ACM 1992, pp. 183-231.

Elliott, Conal, "Programming Graphics Processors Functionally," Proceedings of the 2004 Haskell Workshop, Sep. 22, 2004. 11 pages.

Fried, Ina, "Developer Calls Apple's Tiger a Copycat," CNET News.com, Jun. 28, 2004 [online] Retrieved on Jul. 1, 2004] Retrieved from the Internet URL:http://zdnet.com.com/2102-1104_2250692.html?tag=printthis, 2 pages.

Fried, Ina, "For Apple's Tiger, the Keyword is Search", CNET News.com, Jun. 28, 2004 [online] Retrieved on Jul. 1, 2004] Retrieved from the Internet URL:http://zdnet.com.com/2102-1103_2-5250346.html?tag=printthis, 2 pages.

Guber, John et al., "Dashboard vs. Konfabulator", Jun. 2004, 9 pages.

Haeberli, P. et al., "The Accumulation Buffer: Hardware Support for High-Quality Rendering," Computer Graphics, Aug. 1990, pp. 309-318, vol. 24, No. 4.

Helal et al., "Drishti: An Integrated Navigation System for Visually Impaired and Disabled", Fifth International Symposium on Wearable Computers (ISWC'01), IEEE, 2001, pp. 149-156.

International Search Report, PCT/US2005/008804, Jul. 27, 2005, 3 pages.

International Search Report and Writen Opinion, PCT/US2005/022152, Jul. 10, 2006, 8 pages.

International Search report, PCT/US2005/008805, Aug. 8, 2005, 3 pages.

Invitation to Pay Additional Fees(Form PCT/ISA/206) and Communication Relating to the Results of the Partial Intrenational Search (PCT/ISA/206 (Annex)) for PCT/US2007/077441; dated Jan. 28, 2008, 8 pages.

Invitation to Pay Additional Fees(Form PCT/ISA/206) and Communication Relating to the Results of the Partial Intrenational Search (PCT/ISA/206 (Annex)) for PCT/US2008/050295; dated Jul. 29, 2008.

Konfabulator, "Cupertino, Start your Photocopiers!," [online] [Retrieved on Jul. 1, 2004] Retrieved from the Internet <URL: http://www.konfabulator.com>, 1 p.

Konfabulator, "Konfabulator & Widget Basics," [online] [Retrieved on Jul. 1, 2004] Retrieved from the Internet <URL: http://www.konfabulator.com/info/basics.html>, 3 pp.

Konfabulator, "Screenshots," [online] [Retrieved on Jul. 1, 2004] Retrieved from the Internet <URL: http://www.konfabulator.com/info/screenshots.html>, 2 pages.

Konfabulator, "What is Konfabulator?," [online] [Retrieved on Jul. 1, 2004] Retrieved from the Internet <URL: http://www.konfabulator.com/info/, 3 pages.

Lammers, J., et al., "Maya 4.5 Fundamentals: Particles,"New Riders Publishing, Jan. 14, 2003, 12 pages, [online] [retrieved on Feb. 17, 2007] Retrieved from ProQuest Safari Books Online on the Internet: <URL: http://proquest.safaribooksonline.com/0735713278>, 12 pages.

Microsoft Corporation, "Microsoft® Windows™ Graphical Environment User's Guide", Version 3.0 for MS-DOS® or PC-DOS Operating System, 1990, Document No. SY06851-0290, pp. Cover-vii, 15-75, 315-353.

Microsoft Corporation, "User's Guide Microsoft® Windows™and MS-DOS® 6", 1993, pp. Cover-xvi, 112-121.

Notification of Transmittal of the International Search Report and the Written Opinion of the International Searching Authority, PCT/US2005/022579, 15 pages.

Notification of Transmittal of the International Search Report and the Written Opinion of the International Searching Authority, PCT/US2007/077441, May 8, 2008; 17 pages.

Nvidia, "CG - Teaching Cg," Power Point Presentation, Author and date unknown, pp. 1-16.

Puder, A., "Extending Desktop Applications to the Web," ACM International Conference Proceedings Series, Proceedings of the Jun. 2004 International Symposium on Information and Communication Technologies, 2004, vol. 90, 6 pp.

Rist et al., "Customizing Graphics for Tiny Displays of Mobile Devices", Personal and Ubiquitous Computing, 2002, pp. 260-268, vol. 6.

Rochkind, M. et al., "Common Elements in Today's Graphical User Interfaces: The Good, the Bad, and the Ugly," Interchi '93, AMC, Apr. 24-29, 1993, pp. 470-473.

Segal, Mark and Akeley, Kurt, "The OpenGL Graphics System: a Specification (Version 1.5)," Copyright 1992-2003 Silicon Graphics, Inc., Oct. 30, 2003, 334 pages.

Shantzis, Michael A., "A Model for Efficient and Flexible Image Computing," Computer Graphics Proceedings, Annual Conference Series, Orlando, Florida, Jul. 24-29, 1994, pp. 147-154.

Shiozawa, Hidekazu et al., "Perspective Layered Visualization of Collaborative Workspaces," Proceedings of the International ACM SIGGROUP conference on Supporting Group Work Publisher, Nov. 1999, 5 pages.

Snippet Software, "Product Spotlight Non-browser based portal solution from Snippets Software", Corporate Portal Newsletter, Oct. 2000, vol. 1, No. 10, 3 pages.

Snippet Software, "Snippets Software Platform", Retrieved from the Internet on Jun. 11, 2001 <URL:http://www.snippets.com/products/>.

Snippets Software et al., "Products Overview", Feb. 2002, [online] [Retrieved on Feb. 5, 2008] Retrieved from the Internet URL: http://web.archive.org/web/20020206061508/http://www.snippets.com/products/>.

Staples, Loretta, "Representation in Virtual Space: Visual Convention in the Graphical User Interface," Proceedings of the SIGCHI Conference on Human Factors in Computing Systems, Apr. 1993. http://www.nat.org/dashboard/blog.php3 Dec. 2003, 8 pages.

Stardock et al., "DesktopX General Guide," Aug. 2000, [online] [Retrieved on Jan. 31, 2008] Retrieved from the Internet URL:http://www.stardock.com/products/desktopx/docs/.

Stardock et al., "DesktopX Tutorial", Aug. 2000, [online] [Retrieved on Jan. 31, 2008] Retrieved from the Internet URL:http://www.stardock.com/products/desktopx/tutorial.html.

Stardock et al., "DesktopX WhitePaper", Aug. 2000, [online] [Retrieved on Jan. 31, 2008] Retrieved from the Internet <URL:http://www.stardock.net/media/whitepaper desktopx.html.

Stardock et al., "The User Guide - Version 2", DesktopX 2000.

Stardock et al., "What Can It Do? Making Objects", DesktopX Tutorial, 2001, [online] [Retrieved on Apr. 11, 2008] Retrieved from the Internet URL:http://web.archive.org/web/2001101922285/http://www.stardock.com/products/desktopx/ . . .

Stardock News, DesktopX User Manual On-line:, 1999, 2003 [online] [Retrieved from the Internet on May 11, 2007] <URL:http://www.stardock.comnewsitem.asp?id=538>.

Stardock News/Media/Press.

Stardock, "DesktopX Whitepaper and users Guide" Retrived from the Internet <URL:http://www.stardock.net/media/whitepaper desktopx.html>, 1999, 72 pages.

Tang, J.C. et al., "ConNexto Awarenex: Extending Awareness to Mobile Users," SIGCHI '01, AMC, Mar. 31-Apr. 4, 2001, 8 pages.

Ullenboom, C., "Java is auch eine Insel," 2003, [online] [Retrieved on Apr. 13, 2006] Retrieved from the Internet URL: http://www.galileocomputing.de/openbook/javainse12//java_140000.htm#Xxx998138, 3 pages.

Van Gelder, Allen, and Kwansik, Kim, "Direct vol. Rendering with Shading via Three-Dimensional Textures," Computer Science Dept., Univ. of California, Santa Cruz, CA 95064, 9 pages.

Wardell, "Konfabulator for Windows", Jan. 10, 2004, Retrieved from the Internet on Mar. 6, 2006, URL: http://www.xpthemes.com/forums.aps?MID=19&CMID=19&AID=4472, 6 pages.

Partial Interntional Search Rpeort, dated May 15, 2009, issued in Interntional Application No. PCT/US2008/050047.

Invitation to Pay fees and Partial International Search Report, dated May 8, 2009, issued in PCT/US2008/050038.

Archive of BabelFish.com Inc., Oct. 2003, [online] [Archived by http://archive.org on Oct. 2, 2003; retrieved on Dec. 8, 2008] Retrieved from the Internet URL: <http://web.archive.org/web/20031002115902/www.babelfish.com/en/index.html>.

Starfish Software Introduces Starfish Internet Sidekick; Starfish Internet Sidekick is the best way for Internet users to manage their calendar, contacts and communications, Busiensn Wire, Sep. 23, 1996, [online] [Retrieved on Dec. 8, 2008] Retrieved from the Internet URL: <http://findarticles.com/articles/mi_mOEIN/is_1996_Sept_23/ai_18704672?tag=rel.res1>.

Archive of www.gigaplex.com, Lazar Productions, Nov. 1996, [online] [Archieved by http://archive.org on Nov. 5, 1996; retrieved on Dec. 8, 2008] Retrieved from the Internet URL: <http://web.archive.org/web/19961105081827/www.gigaplex.com/>.

Archive of movies.com, Jan. 2002, [online] [Archived by http://archive.org on Jan. 18, 2002; Retrieved on Dec. 8, 2008] Retrieved from the Internet URL: <http://www.archive.org/web/20020118102516/movies.go.com>.

Siracusa et al., "Mac OA 10.4 Tiger: Dashboard", Apr. 28, 2005, [online] [Retrieved on Aug. 1, 2008] Retrieved from the Internet URL: <http://arstechnica.com/reviews/os/macosz-10-4.ars/17>.

Wardell et al. "Apple's Dashboard vs. Konfabulator vs. DesktopX", Skinning the frog, Jul. 1, 2004, [online] [Retrieved on Aug. 1, 2008] Retrieved from the Internet URL: <http://frogboy.joeuser.com/article/19800>.

Thomas et al., "Animating Widgets in the InterViews Toolkit", Lecture Notes in Computer Science, pp. 26-44, 1995.

JavaBoutique, Oct. 1, 2002. Available at: <http://javaboutique.internet.com/utilities/counter.html>.

VMWare, "VMWare Workstation User's Manual", 2002, pp. 12-13.

Altman, "Visual QuickStart Guide PowerPoint 2000/98, Applying Preset Animations", ProQuest Safari Books, Peachpit Press, May 7, 1999, [online] Retrieved from the Internet: URL: http://proquest.safaribooksonline.com/0201354411; 7 pages.

Akeley, Kurt, and Hanrahan, Pat, "Real-Time Graphics Architecture," http://www.grahics.stanford.edu/courses/cs448a-01-fall, the OpenGL Graphics System, CS448 Lecture 15, Fall, 2001, pp. 1-20.

Altman, R.B., "Visual Quickstart Guide Power Point 2000/98, Applying Preset Animations," ProQuest Safari Books, Peachpit Press, May 7, 1999, 7 pp. [online] Retrieved from the Internet: <URL: http://proquest.safaribooksonline.com/0201354411>.

Beier et al., "The bull's-eye: a framework for web application user interface design guidelines", Proceedings of the Sigchi Conference on Human Factors in Computing Systems, Apr. 2003, pp. 489-496.

Cadiz, JJ et al., "Slideshow: Providing Peripheral Awareness of Important Information," Technical Report MSR-TR-2001-83, (Sep. 14, 2001), 9 pages. Microsoft Corporation, Redmond, WA.

Carey et al., "Integrating Widget Design Knowledge with User Interface Toolkits", Proceedings of the Fifth International Workshop on Computer-Aided Software Engineering, Jul. 1992, pp. 204-212.

Chen et al., "The Model of Optimum Route Selection in Vehicle Automatic Navigation System Based on Unblocked Reliability Analyses", Intelligent Transportation Systems, 2003, Proceedings, IEEE (2003), vol. 2, Oct. 12-15, 2003, pp. 975-978.

Conner et al. "Three-Dimensional Widgets" ACM 1992, pp. 183-231.

Elliott, Conal, "Programming Graphics Processors Functionally," Proceedings of the 2004 Haskell Workshop, Sep. 22, 2004. 11 pages.

Fried, Ina, "Developer Calls Apple's Tiger a Copycat," CNET News.com, Jun. 28, 2004 [online] Retrieved on Jul. 1, 2004] Retrieved from the Internet URL:http://zdnet.com.com/2102-1104_2-250692.html?tag=printthis, 2 pages.

Fried, Ina, "For Apple's Tiger, the Keyword is Search", Cnet News.com, Jun. 28, 2004 [online] Retrieved on Jul. 1, 2004] Retrieved from the Internet URL:http://zdnet.com.com/2102-1103_2- 5250346.html?tag=printthis, 2 pages.

Guber, John et al., "Dashboard vs. Konfabulator", Jun. 2004, 9 pages.

Haeberli, P. et al., "The Accumulation Buffer: Hardware Support for High-Quality Rendering," Computer Graphics, Aug. 1990, pp. 309-318, vol. 24, No. 4.

Helal et al., "Drishti: An Integrated Navigation System for Visually Impaired and Disabled", Fifth International Symposium on Wearable Computers (ISWC'01), IEEE, 2001, pp. 149-156.

International Search Report, PCT/US2005/008804, Jul. 27, 2005, 3 pages.

International Search Report and Writen Opinion, PCT/US2005/022152, Jul. 10, 2006, 8 pages.

International Search report, PCT/US2005/008805, Aug. 8, 2005, 3 pages.

Invitation to Pay Additional Fees(Form PCT/ISA/206) and Communication Relating to the Results of the Partial Intrenational Search (PCT/ISA/206 (Annex)) for PCT/US2007/077441; dated Jan. 28, 2008, 8 pages.

Louch et al., "Multidimensional Widgets", U.S. Appl. No. 12/612,301, filed Nov. 4, 2009.

Warren, "The VMware Workstation 5 Handbook", Jun. 2005, Course Technology PTR, 50 pages.

\* cited by examiner

WIDGET SECURITY

RELATED APPLICATIONS

This application claims the benefit of priority from U.S. Provisional Patent Application No. 60/730,956, filed Oct. 27, 2005, for "Widget Security," which application is incorporated by reference herein in its entirety.

This application is related to the following U.S. patent applications, each of which is incorporated herein by reference in its entirety:

U.S. Provisional Patent Application No. 60/583,125, for "Procedurally Expressing Graphic Objects for Web Pages," filed Jun. 25, 2004;

U.S. patent application Ser. No. 10/874,829, for "User Interface for Assisting in the Installation of an Asset," filed Jun. 22, 2004;

U.S. patent application Ser. No. 10/877,968, for "Unified Interest Layer For User Interface," filed Jun. 25, 2004;

U.S. patent application Ser. No. 11/145,561, for "Application Clipper," filed Jun. 3, 2005;

U.S. patent application Ser. No. 11/145,560, for "Web View Applications," filed Jun. 3, 2005;

U.S. patent application Ser. No. 11/145,023, for "Clip View Applications," filed Jun. 3, 2005;

U.S. patent application Ser. No. 11/148,010, for "Preview and Installation of User Interface Elements in a Display Environment," filed Jun. 7, 2005;

U.S. Provisional Patent Application No. 60/734,016, for "Preview Including Theme Based Installation of User Interface Elements In A Display Environment," filed Nov. 4, 2005;

U.S. patent application Ser. No. 11/282,110, for "Preview Including Theme Based Installation of User Interface Elements In A Display Environment," filed Nov. 16, 2005;

U.S. Provisional Patent Application No. 60/737,899, for "Management of User Interface Elements In A Display Environment," filed Nov. 18, 2005; and U.S. patent application Ser. No. 11/346,603, for "Multiple Dashboards," filed Feb. 1, 2006.

TECHNICAL FIELD

The disclosed implementations relate generally to graphical user interfaces.

BACKGROUND

A hallmark of modem graphical user interfaces is that they allow a large number of graphical objects or items to be displayed on a display screen at the same time. Leading personal computer operating systems, such as Apple MacOS X, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

Although users appreciate interfaces that can present information on a screen via multiple windows, the result can be overwhelming. For example, users may find it difficult to navigate to a particular user interface element or to locate a desired element among a large number of onscreen elements. The problem is further compounded when user interfaces allow users to position elements in a desired arrangement, including overlapping, minimizing, maximizing, and the like. Although such flexibility may be useful to the user, it can result in a cluttered display screen. Having too many elements displayed on the screen can lead to "information overload," thus inhibiting the user to efficiently use the computer equipment.

Many of the deficiencies of conventional user interfaces can be reduced using "widgets." Generally, widgets are user interface elements that include information and one or more tools (e.g., applications) that let the user perform common tasks and provide fast access to information. Widgets can perform a variety of tasks, including without limitation, communicating with a remote server to provide information to the user (e.g., weather report), providing commonly needed functionality (e.g., a calculator), or acting as an information repository (e.g., a notebook). Examples of widgets can be found in U.S. patent application Ser. No. 10/877,968.

Due in part to their simplicity, hundreds of widgets have been developed and publicly distributed. Such ubiquitous use of widgets, however, has created a new challenge for system administrators, particularly in the realm of computer security. For example, since widgets behave like applications there is an opportunity for malicious activity. Malicious widgets can be configured by widget authors to access network resources, file systems and other vital system components to perform unauthorized activities. Such unauthorized activities can include accessing private information, logging user key strokes, redirecting the user to websites, installing a virus, deleting files, displaying inappropriate content and the like.

SUMMARY

In some implementations, a widget security method includes: detecting a security event associated with a widget; and initiating a security action based on the detected security event.

In some implementations, a widget security method detects a security event associated with a widget; assesses a risk associated with the detected security event; and initiates a security action based on the assessed risk.

In some implementations, a widget security method monitors widget activity; determines if the widget activity is consistent with an associated security policy; and responsive to the activity being consistent with an associated security policy initiates a security action.

In some implementations, a widget security method includes: initiating a download process for a widget; during the download process, determining a security event associated with the widget; and performing a security action based on the security event.

In some implementations, a widget security method includes: initiating an installation process for a widget; during the installation process, determining a security event associated with the widget; and performing a security action based on the security event.

Other implementations are disclosed relating to methods, systems, computer-readable mediums, apparatuses and devices.

DETAILED DESCRIPTION

Hardware Architecture Overview

Figure 1:
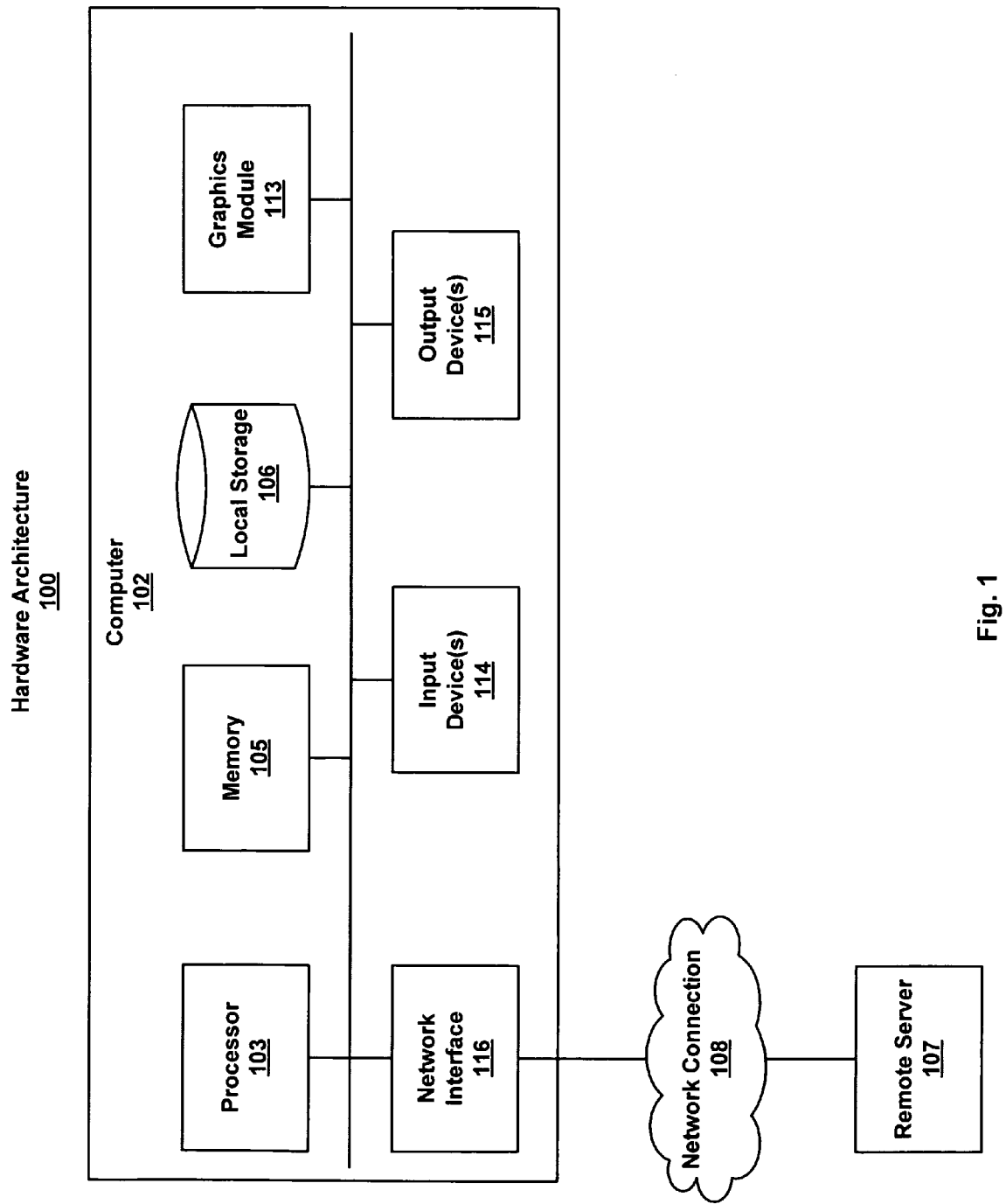
FIG. 1 is a block diagram of hardware architecture for a widget security system.

FIG. 1 is a block diagram of an implementation of hardware architecture 100 for a widget security system. The architecture 100 includes a personal computer 102 coupled to a remote server 107 via a network connection 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While widget security is described herein with respect to a personal computer 102, it should be apparent that the disclosed implementations can be incorporated in, or integrated with, any electronic device that is capable of using widgets, including without limitation, portable and desktop computers, servers, electronics, media players, mobile phones, email devices, personal digital assistants (PDAs), network appliances, firewall applications and the like.

In some implementations, a widget security system can be provided as one or more plug-ins that are installed and run on the personal computer 102. The plug-ins are configured to interact with an operating system (e.g., MAC OS X, WINDOWS XP, LINUX, etc.) and to perform the various widget security functions, as described with respect to FIGS. 4 and 5. A widget security system can also be implemented as one or more software applications running on the computer 102. In some implementations, a widget security system can be another widget that is configurable to communicate with other widgets, applications and/or operating systems. A widget security system can also be characterized as a security framework or model that can be implemented on various platforms and/or networks (e.g., client/server networks, stand-alone computers, portable electronic devices, mobile phones, etc.), and/or embedded or bundled with one or more software applications (e.g., email, media player, browser, etc.).

Dashboard Overview

Figure 2:
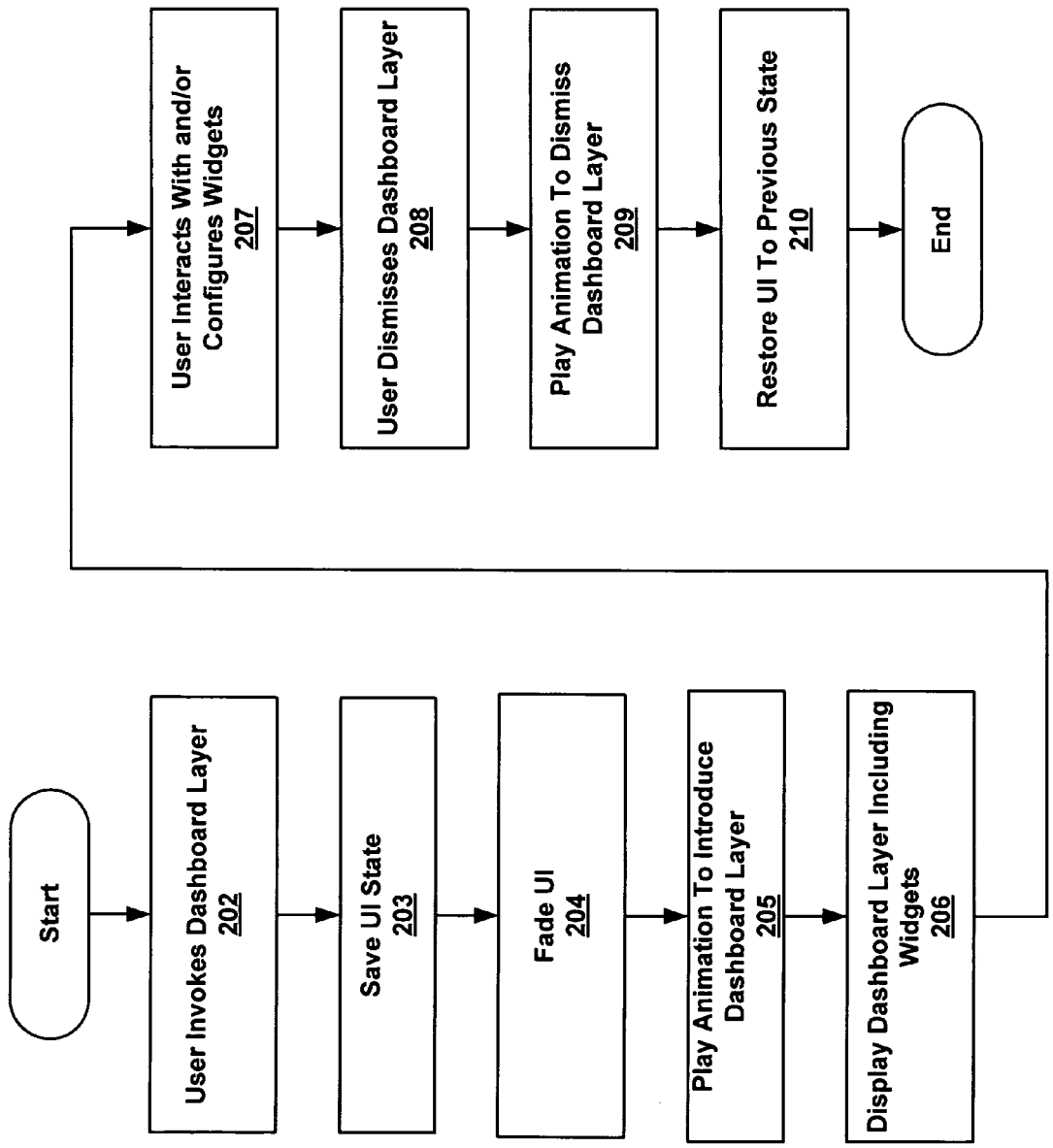
FIG. 2 is a flow diagram of a process flow for activating and using a dashboard.

FIG. 2 is a flow diagram of an implementation of a process for activating and using a dashboard. A dashboard layer (also referred to herein as a "unified interest layer" or "dashboard") is used to manage and display widgets. A user can invoke a dashboard (202) by hitting a designated function key or key combination, or by clicking on an icon, or by selecting a command from an onscreen menu, or by moving an onscreen cursor to a designated corner of the screen. In response to such user input, the current state of the user interface is saved (203), the user interface is temporarily inactivated (204), an animation or effect is played or presented to introduce the dashboard (205) and the dashboard is displayed with one or more widgets (206). If applicable, a previous state of the dashboard is retrieved, so that the dashboard can be displayed in its previous configuration.

In some implementations, the dashboard is overlaid on an existing desktop user interface (UI). When the dashboard is activated, the existing UI may be faded, darkened, brightened, blurred, distorted, or otherwise altered to emphasize that it is temporarily inactivated. The existing desktop may or may not be visible behind the dashboard. The desktop can also be shrunk to a small portion of the display screen while the dashboard is active, and can be re-activated by clicking on it. In some implementations, the desktop is shrunk and presented as a widget. The desktop can be re-activated by clicking on the widget.

The user interacts with and/or configures widgets as desired (207). In some implementations, the user can move widgets around the screen, and can resize widgets if applicable. Some widgets are resizable and some have a fixed size. A widget author can specify whether a widget can be resized. Some widgets automatically resize themselves based on the amount or nature of the data being displayed. Widgets can overlap and or repel one another. For example, if the user attempts to move one widget to a screen position occupied by another widget, one of the widgets is automatically moved out of the way or repelled by the other widget.

The user dismisses the dashboard (208) by invoking a dismissal command, which causes the normal UI to return or re-present itself to the display screen. In some implementations, the dashboard is dismissed when the user presses a function key or key combination (which may be the same or different than the key or combination used to activate the dashboard), or clicks on a close box or other icon, or clicks on negative space within the dashboard (e.g., a space between widgets), or moves an onscreen cursor to a predefined corner of the screen.

In some implementations, the dashboard is automatically dismissed (i.e., without user input) after some predetermined period of time or in response to a trigger event. An animation or other effect is played or presented to provide a transition as the dashboard is dismissed (209). When the dashboard is dismissed, the current configuration or state of the widgets (e.g., position, size, etc.) is stored, so that it can be retrieved the next time the dashboard is activated. In some implementations, an animation or effect is played or presented when re-introducing the UI. The UI is restored to its previous state (210) so that the user can resume interaction with software applications and/or the computer operating system.

In some implementations, the dashboard is configurable. The user can select a number of widgets to be displayed, for example, by dragging the widgets from a configuration bar (or other user interface element) onto the dashboard. The configuration bar can include different types of widgets, and can be categorized and/or hierarchically organized. In some implementations, in response to the user dragging a widget onto the configuration bar, the widget is downloaded from a server and automatically installed (if not previously installed). In some implementations, certain widgets must be purchased, so the user is requested to provide a credit card number or some other form of payment before the widget is installed on the user's machine. In some implementations, widgets are already installed on the user's machine, but are only made visible when they have been dragged from the configuration bar onto the dashboard. The configuration bar is merely an example of one type of UI element for configuring the dashboard. Other configuration mechanisms can be used, such as an icon tray or menu system.

It should be apparent that there are many ways in which dashboards and widgets can be displayed other than those implementations described herein. For example, widgets can be displayed on any user interface or user interface element, including but not limited to desktops, browser or application windows, menu systems, trays, multi-touch sensitive displays and other widgets.

Multiple Dashboards

In some implementations, more than one dashboard is available. For example, the user can create and configure one dashboard to contain widgets related to work, and another for widgets related to personal matters. Different trigger events (e.g., different key combinations, menu selection, etc.) can be used for triggering the dashboards. State information for each dashboard can be saved enabling the dashboards to be restored to their previous respective configurations. Different dashboards can contain one or more of the same widgets. State information for a widget can be maintained separately for each dashboard in which the widget appears, or it can be commonly maintained across all dashboards in which the widget appears. Different dashboards can be available or "owned" for different users of the computer 102, such that each user can only access their own dashboard(s). A user can specify a dashboard as being available to other users, if desired. A user can also specify, for any or all of the dashboards he or she creates, whether other users are permitted to make changes to the dashboard(s).

Software Architecture Overview

Figure 3:
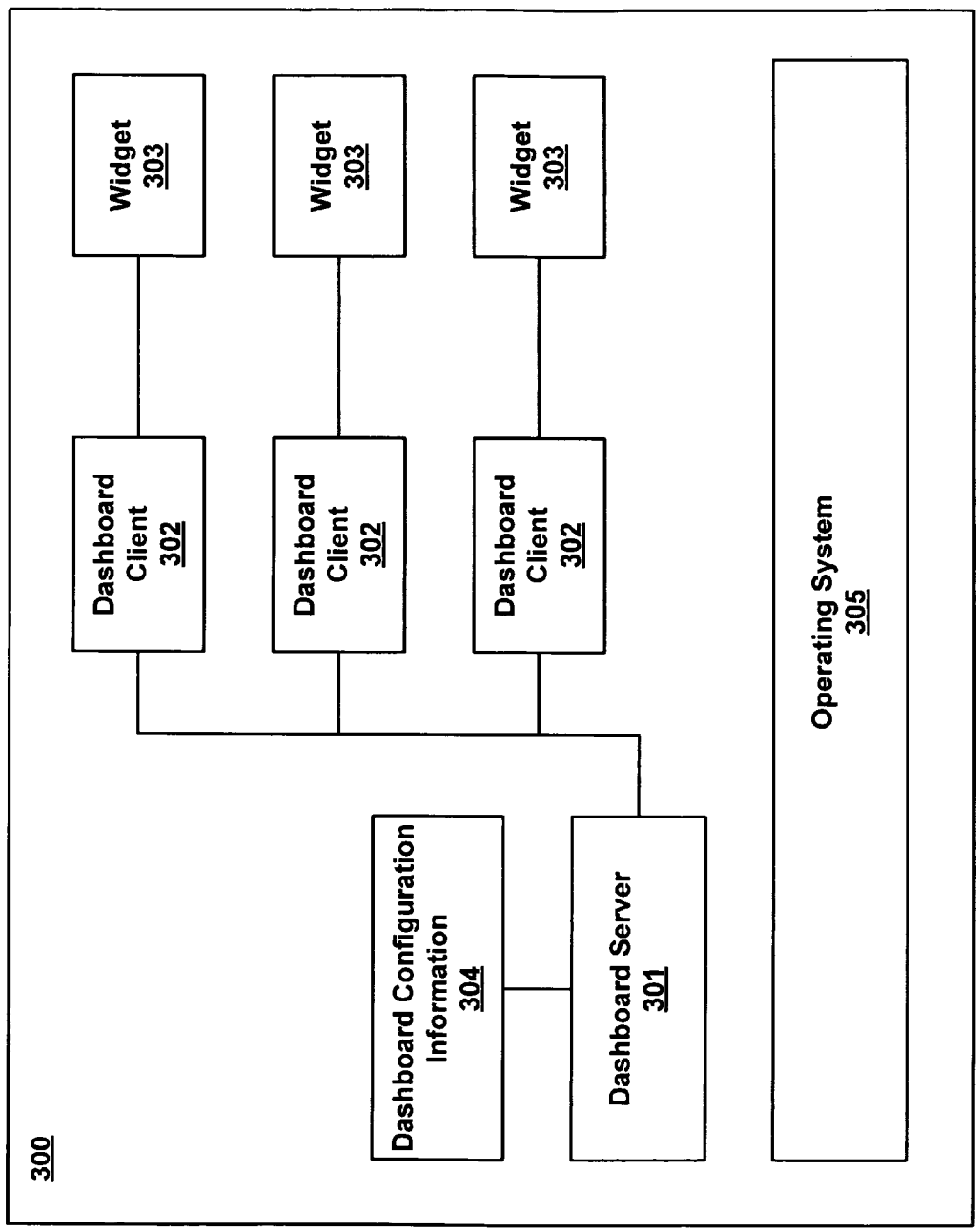
FIG. 3 is a block diagram of software architecture for a widget security system.

FIG. 3 is a block diagram of an implementation of software architecture 300 for a widget security system. The software architecture 300 generally includes a dashboard server 301 one or more dashboard clients 302, and one or more widgets 303. The server 301 and/or clients 302 use dashboard configuration information 304 to specify configuration options for displaying the widgets 303 including access levels and the like (if applicable). Such configuration information can include information for two or more dashboards configured by the same user or by different users.

In some implementations, the widgets 303 are displayed using HTML and related web technology. The dashboard server 301 manages and launches the dashboard client 302 processes. Each dashboard client 302 loads a widget 303 (e.g., an HTML webpage) and related resources needed to display the page. In some implementations, the dashboard clients 302 display the widgets 303 without a conventional window frame, menu bar, or other components typically associated with on-screen windows. This technique provides a clean, straightforward display of the overall dashboard to reduce confusion and clutter. The dashboard clients 302 display their respective widgets 303 by rendering web pages into a "WebView," as described in U.S. patent application Ser. No. 11/148,010. The size of each WebView is defined as metadata associated with the corresponding widget 303. The server 301 provides data for rendering a separate layer that can be overlaid on the normal desktop of the user interface. The widgets 303 are rendered into the separate layer which is drawn on top of the normal desktop, so as to partially or completely obscure the desktop while the dashboard is active.

Dashboard Server

The dashboard server 301 can be a stand-alone process or embedded in another process. The server 301 can be located at the computer 102 or at the remote server 107. In some implementations, the server 301 provides functionality for one or more processes, including but not limited to: non-widget UI management, window management, fast login, event management, loading widgets, widget arbitration, Core Image integration and widget preference management, as described in U.S. patent application Ser. No. 11/148,010.

Dashboard Client

In some implementations, a dashboard client 302 is a process that uses, for example, objects that are defined as part of a development environment, such as Apple Computer's Cocoa Application Framework (also referred to as the Application Kit, or AppKit) for the MacOS X operating system. In some implementations, the dashboard clients 302 can be implemented as simplified browser screens that omit conventional interface features such as a menu bar, window frame, and the like.

Widget Format

In one implementation, each widget 303 is implemented as an HTML file. The HTML file can reference other local and remote resources such as style sheets (e.g., Cascading Style Sheets), other HTML files, JavaScript files, images, and the like. Widgets 303 can be implemented using, for example, a flat bundle file format or a packaged HTML file format. In some implementations, the Flat Bundle format includes an info.plist file.

The Info.plist files describes a widget 303 and provides an identifier for a widget 303 Table I provides an example of Info.plist file contents.

TABLE I

Example of Info.plist File Contents

| Key | Type | Description/Value |
| --- | --- | --- |
| CFBundleIdentifier | CFString | com.apple.widget <widget name> |
| CFBundleName | CFString | Name of the widget. |
| MainHTML | CFString | Name of main HTML resource. |
| Width | CFNumber | Default width of the widget. |
| Height | CFNumber | Default height of the widget. |
| DefaultImage | CFString | Resource name of default PNG file. |
| Plugin (optional) | CFString | Resource name of native plug-in. |
| AllowFileAccessOutsideofWidget | Boolean | Access to files across the file system; limited by the users permissions. |
| AllowFullAccess | Boolean | Access to the file system, Web Kit and standard browser plug-ins, Java applets, network resources, and command-line utilities. |
| AllowInternetPlugins | Boolean | Access to Web Kit and standard browser plug-ins. |
| AllowJava | Boolean | Access to Java applets. |

TABLE I-continued

Example of Info.plist File Contents

| Key | Type | Description/Value |
|---|---|---|
| AllowNetworkAccess | Boolean | Access to any resources that are not file based. |
| AllowSystem | Boolean | Access to command-line utilities using widget script object. |

The keys AllowFileAccessOutsideofWidget, AllowFull-Access AllowInternetPlugins, Allowjava, AllowNetwork-Access, and AllowSystem are Boolean types that can be set by a widget author to enable certain levels of resource access.

Widget Security

Figure 4:
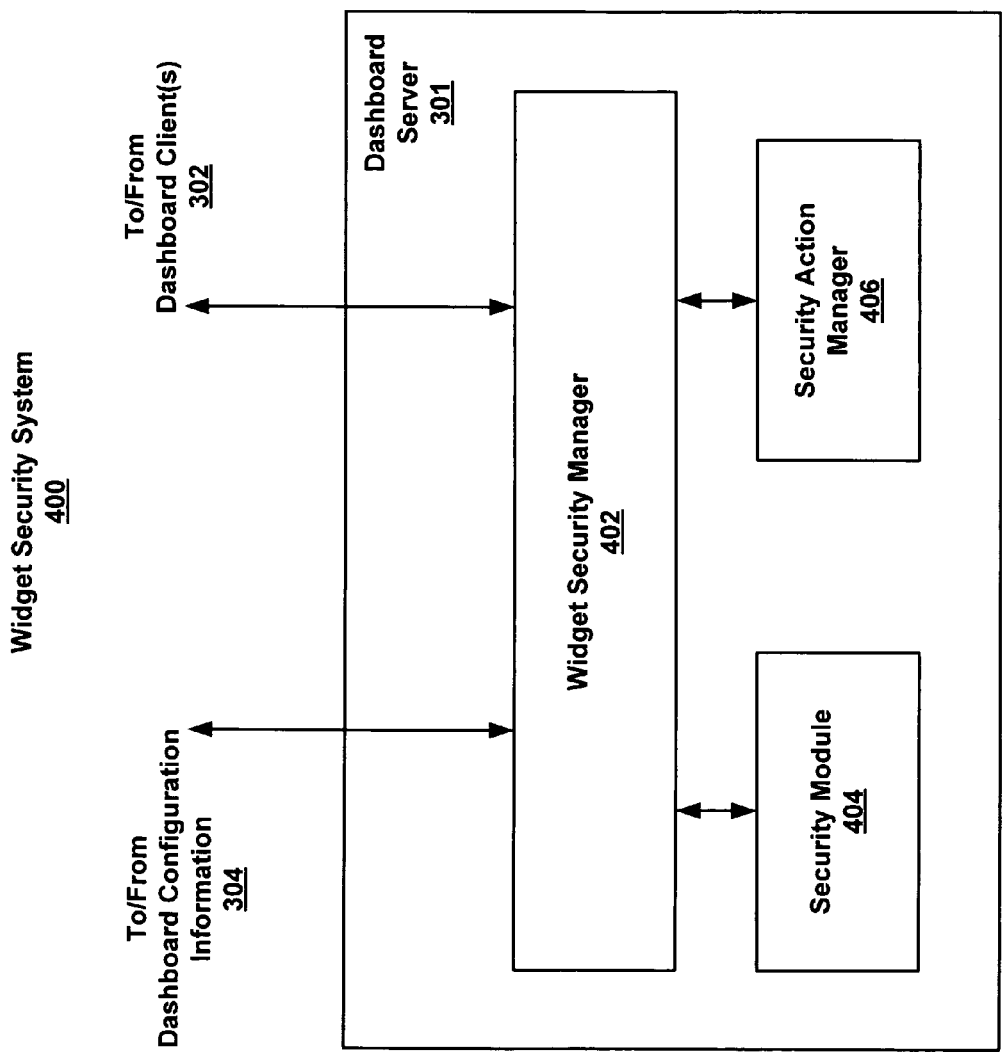
FIG. 4 is a block diagram of a widget security system.

FIG. 4 is a block diagram of an implementation of a widget security system 400. The widget security system 400 can be part of the dashboard server 301 (as shown in FIG. 4) and/or part of one or more dashboard clients 302. Alternatively, the widget security system 400 can be part of the operating system 305, or a separate and independent process or application (e.g., a plug-in or another widget). The various components of the widget security system 400 can be implemented on computing devices, non-computing devices and other electronic devices, including but not limited to a single personal computer, multiple computers via one or more network connections, and portable devices (e.g., media players, mobile phones, email devices, PDAs, embedded devices, etc.).

The widget security system 400 generally includes a widget security manager 402, a security module 404 and a security action manager 406. In some implementations, the widget security manager 402, the security module 404 and the security action manager are code or instructions stored on a computer-readable medium and executed by one or more processors. Some or all of the code can be part of an operating system, application, plug-in, driver, object, etc. In some implementations, the widget security manager 402, the security module 404 and the security action manager 406 are processes running in a client/server framework. For example, the security manager 402 can be a server process and the security module 404 and the security action manager 406 can be client processes that receive security events and other information served by the widget security manager 402 server process.

Widget Security Manager

The widget security manager 402 monitors widgets 303 for security events. The widget security manager 402 can be automatically invoked by a dashboard process or operating system as a background process. It can also be a widget that is invoked when, for example, it is dragged from a configuration bar into a dashboard.

A security event can occur during download, installation and post-launch. Security events generally include any events that could potentially compromise the security of the host system and/or other computers and devices coupled to the host system. Examples of security events include attempts or requests to access restricted resources, such as file systems, network resources, WebKit, browser plug-ins, media players, command-line utilities, Java applets, etc. Other events include but are not limited to: 1) downloading, installing or launching unauthorized widgets, 2) attempting to review unauthorized content generated or presented by widgets, 3) attempting to direct or redirect a user to a website, 4) attempting to take precedence over standard widgets (e.g., a widget disguising itself as a another widget), 5) activating a timed attack in response to an elapsed timer or user input, 6) logging user keystrokes, 7) harvesting personal information, and 8) initiation of unauthorized transactions.

In some implementations, the widget security manager 402 is responsible for handling multiple security events from multiple widgets and dashboards, and includes appropriate data structures for storing events and related information. In some implementations, the widget security manager 402 creates a security event queue (not shown) for each widget that is installed to store and process multiple security events in an organized manner. The widget security manager 402 can also include components for recording security events (e.g., security event logs) for further analysis by, for example, a system administrator. In some implementations, security event information and associated data structures are saved to local storage 106. The security event information can be part of the dashboard configuration information 304 or it can be stored separately in one or more data structures on the computer 102. The security event information can also be stored on a network server to facilitate global security management for networked computer systems.

Security Module

The security module 404 includes components for handling various aspects of widget security risk assessment, and is generally responsible for enforcing a security model or policy. In some implementations, there are at least three contexts where security events can occur: administration, content and resource access. Each of these contexts are described in more detail with respect to FIG. 5.

Security Action Manager

The security action manager 406 selects and initiates appropriate security actions based on input from the security module 404. Generally, security actions address security risks, as defined by a security module or policy. Examples of security actions include but are not limited to: 1) sending a warning message or alert to the user regarding a potential violation of a security policy, 2) requesting a password or personal identification from the user before allowing an event to proceed, 3) disabling the user's dashboard or widget, or 4) changing the properties of the widget (e.g., mark the widget as not trusted).

Widget Security Process Flow

Figure 5:
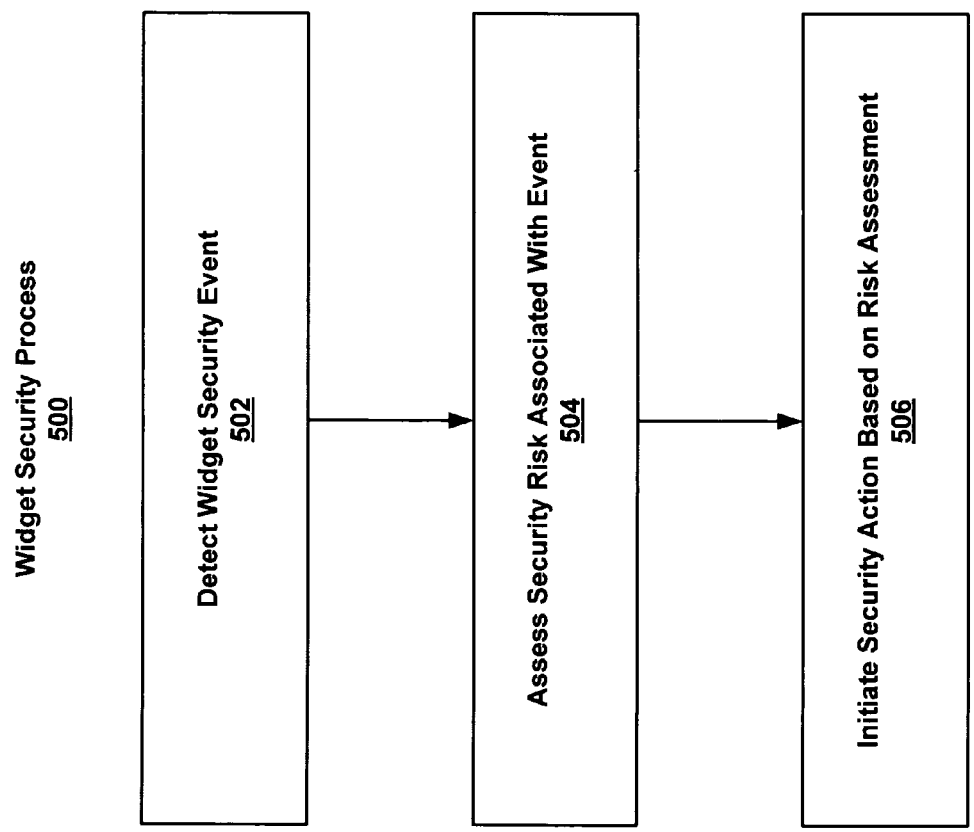
FIG. 5 is a flow diagram of widget security process.

FIG. 5 is a flow diagram of widget security process 500. The widget security system 400 provides security for various activities relating to widgets and dashboards, including downloading, installation, previewing, launching and other events.

In some implementations, the process 500 is a background process that runs continuously when the dashboard is running and/or widgets are active. The process 500 can be turned off or idled when no widgets are running to save processor cycles. The process 500 is not limited to platforms that run dashboards. Rather, the process 500 can also run on a variety of electronic devices (e.g., media players, mobile phones, firewall appliances, embedded systems, etc.) and can integrate and/or communicate with a variety of operating systems and applications, including operating systems and applications that do not provide dashboard or dashboard-type functionality.

The steps of process 500 do not have to occur in any particular order and can run concurrently as multiple processes in multithreading environments on one or more processors, depending upon the computing platform.

Detection of Security Events

The process 500 begins each time a widget security event is detected (502). In some implementations, security events are detected by the widget security manager 402 which communicates with the operating system 305 and/or dashboard clients 302. For example, whenever a widget is downloaded, installed or launched, the operating system 305 informs the widget security manager 400 of the event. If the event occurs after a widget is launched, then the dashboard clients 302 can also provide the widget security manager with security event information. Thus, dashboard clients 302 are particularly useful for guarding against rogue widgets that engage in malicious activities after launch.

Download Security Events

It is often desirable to detect security events early. In some implementations, the widget security manager 402 monitors the widget download process for security events. For example, the widget security manager 402 can examine files (e.g., info.plist) associated with a widget download to determine if the widget is on a "black list" of malicious widgets. If the widget is included on the list, then the security action manager 406 can instruct the operating system to terminate the download process and/or provide a suitable warning to the user. Alternatively, the widget security manager 402 can be configured to allow widget downloads only from authorized or trusted websites. For example, a system administrator may set preferences that enable users to download widgets only from certain designated entities or individuals. .

In some implementations, widgets can be downloaded as a bundle of files that are signed by a third party Certification Authority (CA) using known digital certificate techniques. The digital certificate can be used to identify trusted web server for downloading widgets over networks, such as the Internet. For example, before a user can download a widget, the web security manager 402 can request a secure session (SSL). The widget web server responds by sending the widget security manager 402 its server certificate (which includes a public key). The widget security manager 402 verifies that the web server's certificate is valid and has been signed by a CA (e.g., Entrust), whose certificate is stored at the computer 102. It also verifies that the CA certificate has not expired. If the certificate is valid, the widget security manager 402 generates a one-time, unique "session" key and encrypts it with the web server's public key. The widget security manager 402 (or a browser) sends the encrypted session key to the web server so that it will have a copy. The web server encrypts the message using its private key and recovers the session key. Once this SSL "handshake" is complete, a secure communication channel is established for downloading widgets.

In some implementations, the widget security manager 402 requests a manifest from a trusted website for downloading widgets. After successful completion of an SSL handshake, the widget security manager 402 downloads a manifest describing locations where the widgets can be downloaded (e.g., a URL to a download page). The widgets to be downloaded can be signed by a CA to detect a "man in the middle" attack. In some implementations, a hash function is used to generate and verify hashes (e.g., SHA-1) for widget bundles to verify the integrity of widget files after download.

In some scenarios, a malicious widget may attempt to download suspicious files into folders not normally associated with widgets. In such a case, the operating system can detect such activities and notify the security action manager 406 The security action manager 406 can then take appropriate action, such as deleting or quarantining the suspect files and/or alerting the user of the security event.

In some implementations, dashboards communicate with a trusted network server (e.g., a server on the Internet or an intranet) to gain access to a "black list" of widgets stored on the server that are known security risks. Since the "black list" is stored on the network server it can be accessed by multiple user systems or devices without the user systems or devices downloading a copy of the list each time the list is updated. If a widget is on the "black list," then the security action manager 406 can initiate the appropriate action (e.g., disable or deactivate the widget, prevent installation, etc.). Alternatively, the "black list" or a portion of the "black list" can be stored at the user system or device.

In some implementations, user systems or devices are automatically alerted of the "black list," or updates to the "black list," using known software update technology which notifies user systems or devices when software updates are available (e.g., Apple's "Software Update" application which ships with its Mac OS X operating system). For example, upon receipt of an alert or other notification, a network connection can be established to provide dashboards (e.g., the widget security manager 402) access to the "black list." Using information provided in the "black list," the security action manager 406 can initiate an appropriate security action (e.g., disable or deactivate the widget, terminate or prevent installation or launch, etc.). If the user has suitable privileges, the user can disable or deactivate the automatic alert/notification function using a preference pane or other input mechanism. A user can also specify various properties of the automatic alert/notification, such as whether to display a message or alert the user before establishing a connection with a network server to access the "black list."

Installation Security Events

In some implementations, security events are detected during widget installation. These security events can include (but are not limited to) detecting a potential to access to host or network resources, installation of a virus, spyware, adware or other undesirable applications, and displaying offensive content. If the widget security manager 402 detects such events, it instructs the security action manager 406 to take appropriate security actions. For example, anti-virus, anti-spyware, and anti-adware applications can be invoked by the security action manager 406 as needed to seek out and remove suspect applications and files. Content filters can also be invoked to detect offensive content (e.g., adult content), as described with respect to FIG. 5.

In some implementations, the widget security manager 402 invokes a security protocol in response to an installation security event which can include storing various state or status information about the widgets for use in subsequent security assessments and actions. For example, the widget security manager 402 can store data related to the state of the widget at installation, including a list of resources that the widget is allowed to access, locations of widget files, security risk levels and the like. After the widget is launched, the installation state can be compared to future widget states to determine if the widget is functioning differently than expected when first launched. For example, prior to launch a widget may have requested access to network resources but not the host file system, i.e., the widget's installation state. If after launch the widget attempts to access the host file system, i.e., a current widget state, the current widget state is compared with the widget's installation state, and the result of the comparison will be used to determine if a security event exists.

Post-Launch Security Events

Even if no security events are detected during download or installation, widgets can be continuously monitored by the widget security manager 402 after launch. For example, a widget may contain a virus that is launched at some predetermined time after launch or in response to user input (e.g., a particular key combination) and attempts to access host or network resources. In such a scenario, the operating system 305 informs the widget security manager 402 of the access attempt, the security module 404 determines the level of risk for the event, and the security action manager 406 initiates the appropriate security action based on the risk assessment (e.g., disable the widget).

In multiple dashboard implementations, certain widgets may be restricted from being installed in certain dashboards. Likewise, users may be restricted from launching certain widgets in dashboards for other users. For example, a guest user on a computer may be restricted from launching certain widgets in the owner's personal dashboards. In such a scenario, the widget security manager 402 is informed of the guest login by the operating system 305. The widget security manager 402 instructs the security action manager 406 of the attempted widget installation by a guest user, and the security action manager 406 takes the appropriate security action (e.g., disable the widget when its in the owner's personal dashboard).

Risk Assessment

In response to a detected security event, the security module 404 assesses the security risk associated with the security event (504). In some implementations, risk assessment includes identifying risk based on characteristics of the security event and one or more policies that are associated with the type of event, then determining whether a breach of security has occurred or would occur if the event proceeds. For example, if a launched widget attempts to access a host or network resource, and such access is unauthorized, then the security module 404 informs the security action manager 406 of the attempted access, so the appropriate security action can be initiated (e.g., disable the widget).

In some implementations, risk assessment includes determining whether a widget's request to access a network resource is reasonable given the widget's class or type. For example, it may be unreasonable for a "clock" widget to request access to network resources. Likewise, it may be reasonable for a "browser" widget to request access to standard browser plug-ins but unreasonable to request access to command-line utilities. Examples of widget classes include: games, date and time, news feeds (e.g., RSS feeds), system utilities (e.g., a password maker, battery level indicator, wireless connection indicator), sight and sound (e.g., media players), cam viewers, widget tools (e.g., calculator, currency converter), application enhancers (e.g., status indicators), search tools (e.g., browser, dictionary), etc.

In some implementations, a widget can be classified based on information bundled with the widget (e.g., included in the info.plist). If the widget author has requested network access (e.g., AllowNetworkAccess=TRUE), then the widget security manager 400 would classify the widget accordingly.

In some implementations, a widget could be classified by the user during a preview session. Preview sessions are described in U.S. patent application Ser. No. 11/148,010. Since information provided by the widget author may intentionally or unintentionally not match the advertised functions of the widget, the user can be prompted to provide feedback during a preview session that could be used to classify the widget. For example, the user could be requested to categorize the widget class through a dialogue box or equivalent UI element for receiving user input.

Still another opportunity to classify a widget could occur by running the widget through a widget clearing house prior to installation. A widget clearing house can be, for example, a trusted website that maintains a database of widget information for safe and/or malicious widgets. For example, the security module 404 could send a request to a clearing house (e.g., via an HTTP request) which could provide an accurate description of the widgets functions that can be used to classify the widget.

In some implementations, the security module 404 examines the application code bundled with the widget to determine its class. For example, if the widget bundle or package contents includes JavaScript (indicated by a .js extension), then the code is examined for certain calls that invoke resources, such as widget.openApplication, widget.system, or widget.openURL.

In some implementations, the security module 404 can determine whether a widget is included on a "black list" of malicious widgets that are known to engage in malicious activity, or alternatively, on a "white list" of safe widgets. If the widget is on a list, then the security module 404 uses such information to assign an appropriate risk level, and instruct the security action manager 406 to initiate an appropriate security action, if any. The lists can be stored locally (e.g., local storage device 106) or retrieved or accessed from a remote server (e.g., remote server 107).

In some implementations, risk assessment is a dynamic process. The security module 404 may change the security risk associated with a widget based on new activities. For example, a widget can be declared safe during installation, but later release a virus after installation. In this scenario, the widget security manager 402 detects the suspect activity as a security event and the security module 404 re-assesses the risk level of the widget based on the security event. The risk re-assessment can include comparing the widget's installation state with the widget's current state and re-assessing the risk based on the result of the comparison. Historical information (e.g., security event log) can also be used re-assess risk by determining patterns of activity associated with certain levels of risk.

Security Actions

After the security event has been assessed by the security module 404, one or more security actions are initiated and managed by the security action manager 406 based on the risk assessment (506). In some implementations, the security action manager 406 accesses an indexed list of security actions (not shown) which are associated with certain levels and/or types of risk assigned by the security module 404.

For example, if the security event is classified as "low risk" then the security action may be an alert message sent to the user, or a request for a password, depending upon the security event and/or widget class. If the security event is classified as "high risk" then the security action could include disabling the widget and/or dashboard.

In some implementations, performing a security action includes informing a user about the security risk; requesting a response from the user; selecting a security action based on the response; and initiating the selected security action. For example, during installation the security module 404 detects a potential security risk due to access requests made by a widget (e.g., AllowFullAccess=TRUE), then the security action manager 406 issues a warning message to the user. One example of a suitable warning message can be: "This widget is requesting full access to all host system and network resources. Would you like to continue with the installation or quit?" Depending upon the user's response, the security action manager 406 either allows the installation to continue or terminates the installation process.

In some implementations, the security action manager 402 allows a time-based trial period in which a widget has limited access to host or network resources. For example, a user may be allowed to use a suspect widget for a predetermined amount of time (e.g., 24 hours) during which time the widget security manager 402 monitors the widget's activity. If no security events are detected, then widget is allowed full or additional access to host and/or network resources.

It should be apparent that there are other situations where a warning message would not be appropriate for the risk level of the security event. For example, if the resource request made by the author is completely inconsistent with the widget class, then it may be appropriate to automatically terminate the installation without the user's permission. For example, if a "game" widget is attempting to access the host computer's file system, then the security action manager 406 would terminate the installation since such a request would be inconsistent with the resource needs of a "game" widget. In such a scenario, the security action manager 406 could send a message to the user explaining why the widget was not installed. In some implementations, the security action manager 406 logs the security event and sends the log to a clearing house as a possible malicious widget. The security action manager 406 adds the widget to a local "black list" of malicious widgets for use in future security risk assessment and actions.

As previously described, the security module 404 is responsible for assessing various risks. These security risks occur in a variety of contexts. Three of these contexts (administrative, content and resource access) are described, in turn, below.

Administrative Security

Administrative security includes security events related to user privileges for downloading, installing and launching. This type of security would typically be found in networked computer systems that are managed by a system administrator, such as corporate computer networks that have multiple users sharing network resources (e.g. client/server topology). Administrative security is also applicable to stand-alone computers that are shared by multiple users.

In a networked environment, it may be desirable to set and store privileges with respect to widgets and dashboards. For example, a system administrator can use the widget security system 400 to enforce a security policy by setting user privileges via an administrative UI (not shown). In such an implementation, the widget security system 400 can be installed on a server coupled to a centralized system administration computer. Such a configuration could include a central repository of widget and dashboard information, as well as provide centralized control for management and enforcement of widget security policies. An example administrative security policy includes, for example, restricting certain users or user groups from downloading, installing, launching, and/or using certain widgets based on different security criteria. Examples of administrative security criteria include but are not limited to: the widget's class, the location of the host machine, a profile of the user or user group, and any other suitable criteria for assigning privileges.

For example, if a user attempts to download, install and/or launch a widget, the widget security manager 402 detects an administrative security event. The security module 404 receives notification of the event from the widget security manager 402 and determines if the user has the appropriate privileges to proceed with the event. If the user has the appropriate privileges, then the event can proceed. Otherwise, the security module 404 informs the security action manager 406 of the event and the level of security risk, so that the security action manager 406 can initiate one or more security actions.

Different privileges can be granted to different users or user groups as desired, and each user or user group can have multiple sets of privileges that can be invoked based on a variety of factors, as described below.

Privileges can be granted or denied based on widget class. In some implementations, widgets are tagged so as to identify them with a particular class of widgets (e.g., games, utilities, viewers). For example, a game widget may be restricted from being installed on certain host machines (e.g., an employee computer) or from being used during certain times (e.g., during working hours). A time-based privilege may specify, for example, on/off times or allocate an amount of time to use a widget. Time-based privileges can also be used to control bandwidth and access to limited resources. For example, if hundreds of users are concurrently using a widget that accesses a limited resource (e.g., a single server), then by limiting use of the widget to certain groups of users during certain times of the day (e.g., through privilege settings) bandwidth and access problems can be reduced.

Privileges can be granted or denied based on the location of the host machine. For example, if the host machine is located in a secure facility, then some or all network access privileges can be denied or restricted. In some implementations, the location of a host machine (e.g., a lap top computer) can be tracked using a position locator (e.g., global positioning system (GPS), network-based positioning, etc.), and the user's privileges can be changed based on the location of the host machine.

Privileges can be granted or denied based on the context or environment in which the widget will run. For example, if a user is using a word processor application, then the user's privileges would include the ability to launch and use widgets that enhance word processing applications (e.g., dictionary or encyclopedia widgets), but restrict widgets that are outside the current context from being launched or used.

In multi-dashboard environments, each dashboard could be associated with a different set of privileges. One dashboard could be for work-related widgets (e.g., calculator, dictionary) and another dashboard could contain widgets for personal use (e.g., media player). In such environments, it may be advantageous to have different sets of privileges for each dashboard. This could be useful for shared computers where a guest login would have access to work-relate dashboards but not the owner's personal dashboards. Multiple dashboard functionality is described in U.S. patent application Ser. No. 11/148,010.

It should be apparent that any number of factors can be used to set privileges related to widgets and dashboards based on security policies, user preferences and/or user profiles.

Content Security

Content security is concerned with controlling access to content provided by widgets (e.g., media players, browsers). For example, an employer (or parent) may want to control access to certain content. In some implementations, the security module 404 receives content security events from, for example, a content filter. The content filter can be part of the widget security system 400 or external to the widget security system 400. A content filter detects certain content (e.g., adult content, personal health care information) using a variety of known techniques (e.g., URL or keyword filtering, dynamic content filter, etc.). In some implementations, the content filter is configured to send reports to the security module 404 via the widget security manager 402. Alternatively, the content filter can report directly to the security module 404. In some implementations, the content filter sends raw data to the security module 404, which then uses the raw data to make a risk assessment. The security action manager 406 initiates and manages one or more security actions (e.g., disable the widget) based on the risk assessment, reports and/or user profiles and content filter information.

In business environments, it may be desirable to restrict the class of users who can access certain content and how that content is viewed, or limit the amount or type of content that can be accessed. For example, content providers may want to limit a user's access to certain content. Such content can be distributed using a digital rights management (DRM) framework. The security module 404 enables secure delivery of protected content for playback through a widget by providing a secure environment that can enforce DRM rules (e.g., via the security action manager 406).

In some implementations, the DRM rules associated with the content can be added to the security policy enforced by the security module 404. For example, if the content's DRM rules do not allow copying, and a widget requests access to command-line copy utilities, then the security action manager 406 will be alerted to the violation, so it can take appropriate security actions (e.g., disable widget).

Resource Access Security

Widgets can request access to various resources (e.g., file systems, networks, command-line utilities, etc.). Resources can be restricted based on the widget's class, as previously described with respect to administrative security. It may be desirable, however, to partially restrict access to resources based on whether the widget is being previewed, running in a trial-period or in full operation.

In some implementations, if a widget is being previewed the widget security manager 402 automatically disables access to certain resources that are required for previewing widget functionality prior to installation. For example, a widget's request to access a file system or a command-line utility can be denied without diminishing the user's preview experience. During normal widget operation, additional access to resources can be permitted as requested.

Various implementations of a widget security system have been described with respect to FIGS. 1-5. It should be apparent that these implementations can be modified and still remain within the scope of the appended claims.

What is claimed is:

1. A widget security method, comprising:
   detecting a security event associated with a widget;
   generating data indicative of the security event;
   processing the data to determine a risk level associated with the detected security event, where the risk level is determined by an action selected from a group of actions consisting of reviewing information associated with the widget, comparing widget information with a user profile, and examining programming code associated with the widget;
   initiating a security action based on the risk level,
   where the detecting, generating, processing and initiating are performed by one or more processors of a hardware device.

2. The method of claim 1, wherein detecting includes detecting unauthorized access to resources.

3. The method of claim 1, wherein detecting includes detecting unauthorized access to content.

4. The method of claim 1, wherein processing the data to determine a risk level associated with the detected security event includes:
   identifying risks based on characteristics of the event and one or more policies associated with the event; and
   identifying a risk based on the results of the comparison.

5. The method of claim 1, wherein processing the data to determine a risk level associated with the detected security event includes:
   monitoring widget activity; and
   identifying a risk based on the activity.

6. The method of claim 5, wherein monitoring widget activity includes logging widget activity.

7. The method of claim 1, wherein processing the data to determine a risk level associated with the detected security event includes:
   retrieving a list of widgets;
   determining if the widget is on the list; and
   assessing risk associated with the widget based on whether the widget is included on the list.

8. The method of claim 1, wherein performing a security action includes:
   informing a user about the security risk;
   requesting a response from the user;
   selecting a security action based on the response; and
   initiating the selected security action.

9. The method of claim 1, wherein performing a security action is selected from a group of security actions including at least one of disabling the widget, notifying the user of the security event, or changing resource access rights associated with the widget.

10. A computer-readable medium having instructions stored thereon, which, when executed by a processor in a widget security system, causes the processor to perform the operations of:
    detecting a security event associated with a widget;
    determining a risk level associated with the detected security event, where the risk level is determined by an action selected from a group of actions consisting of reviewing information associated with the widget, comparing widget information with a user profile, and examining programming code associated with the widget; and
    performing a security action based on the risk level.

11. The computer-readable medium of claim 10, wherein detecting includes detecting unauthorized access to resources.

12. The computer-readable medium of claim 10, wherein detecting includes detecting unauthorized access to content.

13. The computer-readable medium of claim 10, wherein processing the data to determine a risk level associated with the detected security event includes:

identifying risks based on characteristics of the event and one or more policies associated with the event; and identifying a risk based on the results of the comparison.

14. The computer-readable medium of claim 10, wherein processing the data to determine a risk level associated with the detected security event includes:

monitoring widget activity; and identifying a risk based on the activity.

15. The computer-readable medium of claim 14, wherein monitoring widget activity includes logging widget activity.

16. The computer-readable medium of claim 10, wherein processing the data to determine a risk level associated with the detected security event includes:

retrieving a list of widgets;

determining if the widget is on the list; and assessing risk associated with the widget based on whether the widget is included on the list.

17. The computer-readable medium of claim 10, wherein performing a security action includes:

informing a user about the security risk;

requesting a response from the user;

selecting a security action based on the response; and initiating the selected security action.

18. The computer-readable medium of claim 10, wherein performing a security action is selected from a group of security actions including at least one of disabling the widget, notifying the user of the security event, or changing resource access rights associated with the widget.

19. A widget security system, comprising:

a widget security manager configured for detecting a security event associated with a widget;

a security module coupled to the widget security manager and configured for determining a risk level associated with the detected security event, where the risk level is determined by an action selected from a group of actions consisting of reviewing information associated with the widget, comparing widget information with a user profile, and examining programming code associated with the widget; and a security action manager coupled to the widget security manager and configured for initiating a security action based on the assessed risk.

* * * * *

UNITED STATES PATENT AND TRADEMARK OFFICE
CERTIFICATE OF CORRECTION

PATENT NO.       : 7,743,336 B2
APPLICATION NO.  : 11/432295
DATED            : June 22, 2010
INVENTOR(S)      : John O. Louch et al.

It is certified that error appears in the above-identified patent and that said Letters Patent is hereby corrected as shown below:

On the face page, in field (56), under "Other Publications", in column 2, line 4, delete "devices" and insert -- devices/devices --, therefor.

On page 4, under "Other Publications", in column 1, line 2, delete "hup://" and insert -- http:// --, therefor.

On page 4, under "Other Publications", in column 1, line 17, delete "AcCM" and insert -- ACM --, therefor.

On page 4, under "Other Publications", in column 1, line 38, delete "Writen" and insert -- Written --, therefor.

On page 4, under "Other Publications", in column 1, line 52, delete "Retieved" and insert -- Retrieved --, therefor.

On page 5, under "Other Publications", in column 1, line 45, delete "Writen" and insert -- Written --, therefor.

On page 5, under "Other Publications", in column 1, line 50, delete "Intrenational" and insert -- International --, therefor.

On page 5, under "Other Publications", in column 1, line 54, delete "Intrenational" and insert -- International --, therefor.

On page 5, under "Other Publications", in column 2, line 67, delete "Retrived" and insert -- Retrieved --, therefor.

On page 6, under "Other Publications", in column 1, line 11, delete "Interntional Search Rpeort," and insert -- International Search Report, --, therefor.

Signed and Sealed this
Twenty-fifth Day of October, 2011

David J. Kappos
*Director of the United States Patent and Trademark Office*

CERTIFICATE OF CORRECTION (continued)
U.S. Pat. No. 7,743,336 B2

On page 6, under "Other Publications", in column 1, line 12, delete "Interntional" and insert -- International --, therefor.

On page 6, under "Other Publications", in column 1, line 21, delete "Busienss" and insert -- Business --, therefor.

On page 6, under "Other Publications", in column 1, line 26, delete "Archieved" and insert -- Achieved --, therefor.

On page 6, under "Other Publications", in column 2, line 39, delete "Writen" and insert -- Written --, therefor.

On page 6, under "Other Publications", in column 2, line 44, delete "Intrenational" and insert -- International --, therefor.

In column 1, line 49, delete "modem" and insert -- modern --, therefor.

In column 5, line 35, delete "301" and insert -- 301, --, therefor.

In column 5, line 39, delete "303" and insert -- 303, --, therefor.

In column 6, line 32, delete "303" and insert -- 303. --, therefor.

In column 7, line 16, delete "Allowjava," and insert -- AllowJava, --, therefor.

In column 9, line 39, delete "individuals. ." and insert -- individuals. --, therefor.

In column 10, line 8, delete "406" and insert -- 406. --, therefor.

In column 10, line 60, delete "widgets" and insert -- widget --, therefor.

In column 13, line 11, delete "t o" and insert -- to --, therefor.

In column 14, line 64, delete "relate" and insert -- related --, therefor.